US006472638B1

(12) United States Patent
Sperry et al.

(10) Patent No.: US 6,472,638 B1
(45) Date of Patent: Oct. 29, 2002

(54) APPARATUS AND METHOD FOR PRODUCING BAGS AND FOAM-IN-BAG CUSHIONS

(75) Inventors: Charles R. Sperry, Springfield, VT (US); Vincent A. Piucci, Jr., Spencer, MA (US)

(73) Assignee: Sealed Air Corporation, Saddlebrook, NJ (US)

( * ) Notice: Subject to any disclaimer, the term of this patent is extended or adjusted under 35 U.S.C. 154(b) by 0 days.

(21) Appl. No.: 09/709,379

(22) Filed: Nov. 13, 2000

Related U.S. Application Data

(62) Division of application No. 09/076,087, filed on May 12, 1998, now Pat. No. 6,178,725.

(51) Int. Cl.[7] .................................................. H05B 3/00
(52) U.S. Cl. ........................ 219/243; 219/388; 53/370.7
(58) Field of Search .............................. 219/243, 244, 219/221, 526, 469–471, 388, 535; 53/551–554, 451, 389.3, 370.7, 373.7, 375.9; 493/194, 199, 203; 492/46; 156/583.5, 251, 515, 499

(56) References Cited

U.S. PATENT DOCUMENTS

| 2,897,641 | A | | 8/1959 | Simon et al. | |
|---|---|---|---|---|---|
| 3,253,122 | A | * | 5/1966 | Kochmer et al. | 156/583.5 |
| 3,283,126 | A | * | 11/1966 | Velyel | 156/583.5 |
| 3,291,963 | A | * | 12/1966 | Wetzel | 156/583.5 |
| 3,382,642 | A | | 5/1968 | Shaw | |
| 3,384,528 | A | * | 5/1968 | Lehmacher et al. | 156/251 |
| 3,735,551 | A | | 5/1973 | Pratt | |
| 3,954,371 | A | | 5/1976 | Hutt et al. | 493/203 |
| 4,131,503 | A | | 12/1978 | Plate | 493/194 |
| 4,378,666 | A | | 4/1983 | Onishi | |
| 4,586,318 | A | | 5/1986 | Litt et al. | |
| RE32,383 | E | | 3/1987 | Banks et al. | |
| 4,674,268 | A | | 6/1987 | Gavronsky et al. | |
| 4,800,708 | A | | 1/1989 | Sperry | |
| 4,854,109 | A | | 8/1989 | Pinarer et al. | |

(List continued on next page.)

FOREIGN PATENT DOCUMENTS

| EP | 534 457 | | 3/1993 | |
|---|---|---|---|---|
| GB | 686200 | * | 1/1953 | 219/243 |
| WO | 98/14315 | | 4/1998 | |

OTHER PUBLICATIONS

SpeedyPacker™ System User's Guide (complete copy).
MicroMo® Motors, 3 pages, Gearhead Series 30/1, MicroMo Electronics, Inc., 742 Second Avenue S., St. Petersburg, Florida 33701.
Marland–Ringspann® ZZ Series Freewheels, Bulletin ZZ–95, (3 pages) Zurn Industries, Inc., Marland Clutch Division, 650 E. Elm Avenue, P.O. Box 308, La Grange, Illinois 60525–0308.
"Instapak® Foam 'N Fill® System from Sealed Air Corporation", 2 page brochure, Jun. 1986.
"Distribution IndustryTargeted For automated Instapak® System Sales" (2 pages) Sealed Air Corporation, Feb. 1987.
"Instapak® Foam 'N Fill™ Packaging System Operator's Manual", Sealed Air Corporation, all pages.

*Primary Examiner*—John A. Jeffery

(57) ABSTRACT

A bag forming apparatus and method that features a single drive unit for operating both a drive roller and cross-cut mechanism with the drive motor assembly being internalized within the drive roller. The bag forming apparatus and method also features a easy slide in, slide out edge sealer and vent hole former inserts that are held by, and move with, the bag width adjustable driven rollers. The edge seal inserts feature a heating element that is compressed against the film material by an internal bias in the edge sealer insert. A heating element can also be used for the vent hole inserts. The heating element can be a plug-in heating unit easily inserted and removed from the remainder of the insert.

28 Claims, 15 Drawing Sheets

U.S. PATENT DOCUMENTS

| | | |
|---|---|---|
| 4,898,327 A | 2/1990 | Sperry et al. |
| 4,938,007 A | 7/1990 | Sperry |
| 4,999,975 A | 3/1991 | Willden et al. |
| 5,027,583 A | 7/1991 | Chelak |
| 5,139,151 A | 8/1992 | Chelak |
| 5,255,847 A | 10/1993 | Sperry et al. |
| 5,335,483 A | 8/1994 | Gavronsky et al. |
| 5,376,219 A * | 12/1994 | Sperry et al. ............... 219/243 |
| 5,575,435 A | 11/1996 | Sperry et al. |
| 5,679,208 A | 10/1997 | Sperry et al. |
| 5,727,370 A | 3/1998 | Sperry |
| 5,776,510 A | 7/1998 | Reichental et al. |
| 5,794,406 A | 8/1998 | Reichental et al. |

\* cited by examiner

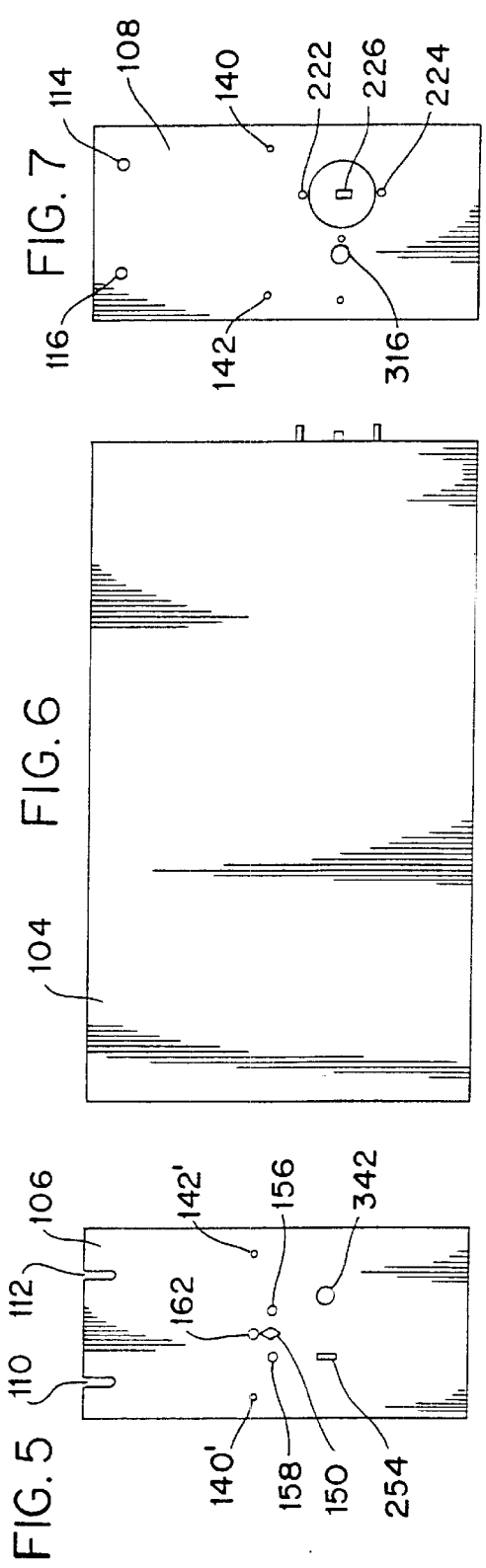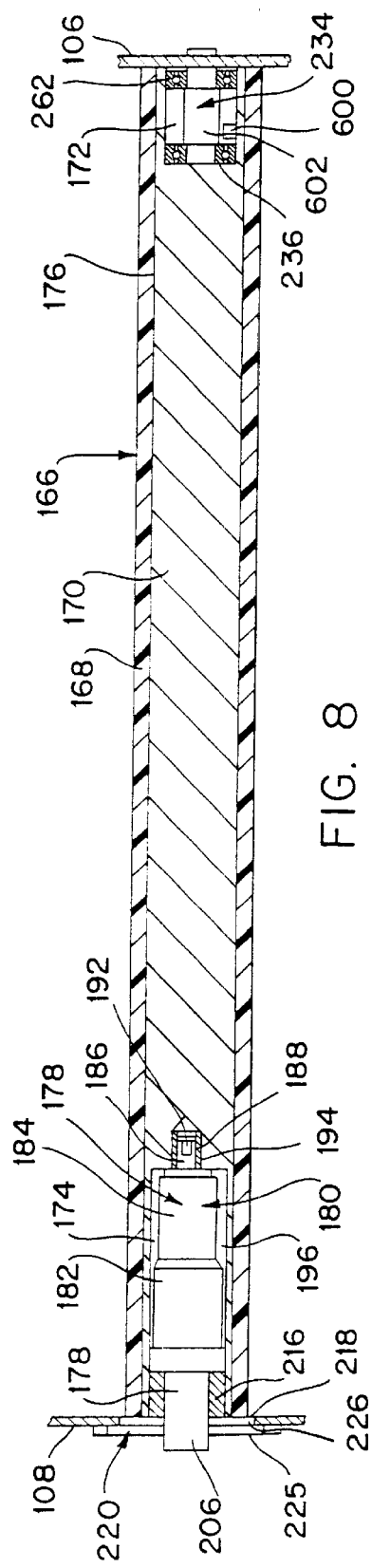

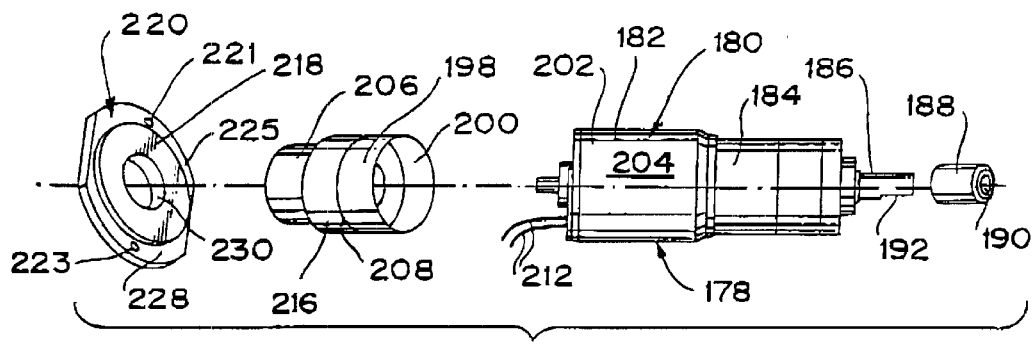
FIG. 9
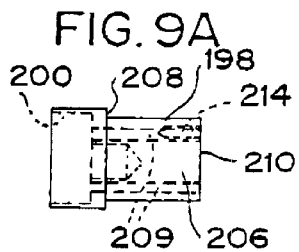
FIG. 9A
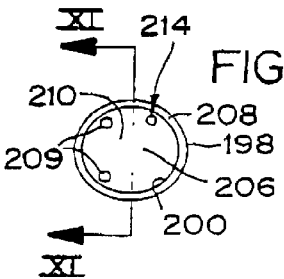
FIG. 9B
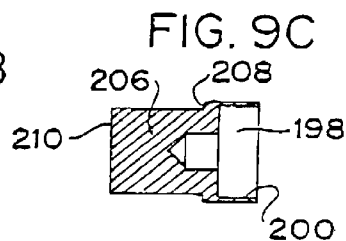
FIG. 9C
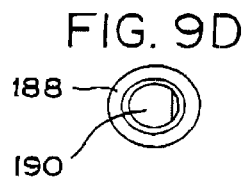
FIG. 9D
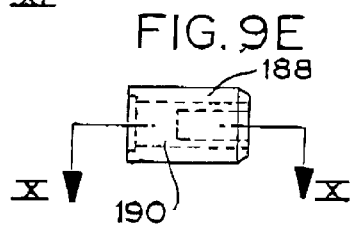
FIG. 9E
FIG. 9F
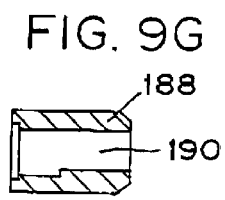
FIG. 9G
FIG. 9H
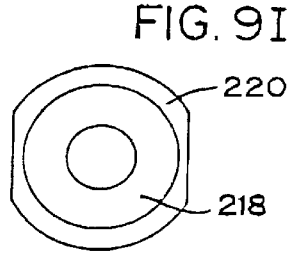
FIG. 9I
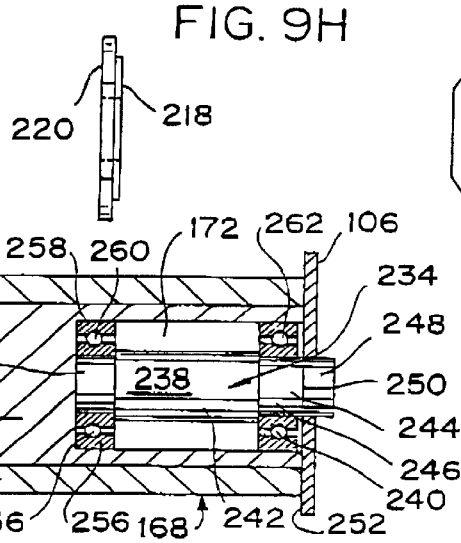
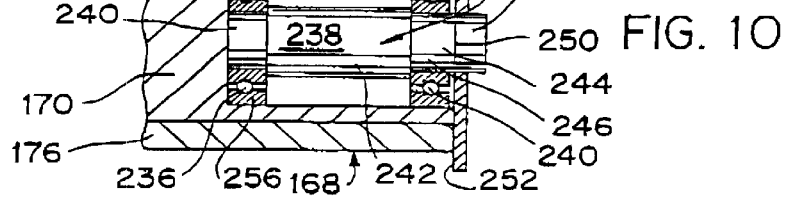
FIG. 10

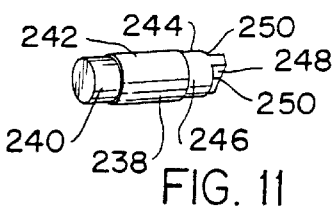
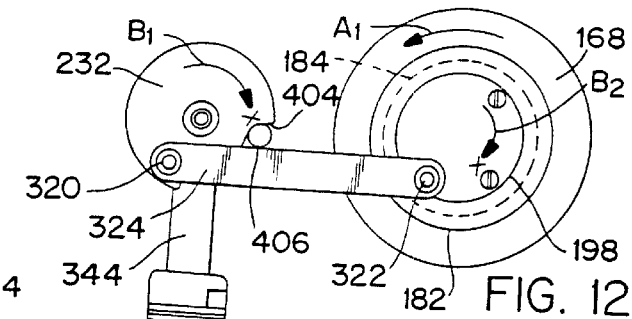
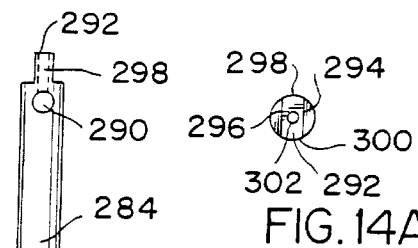
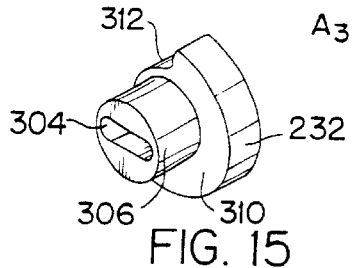
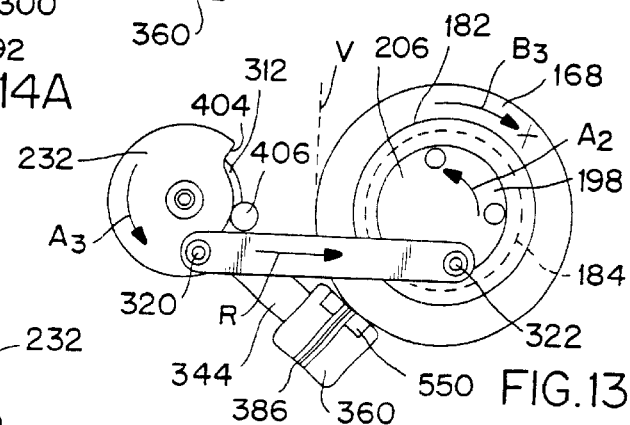
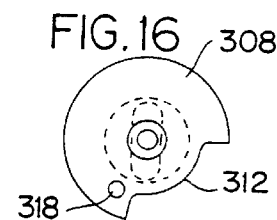
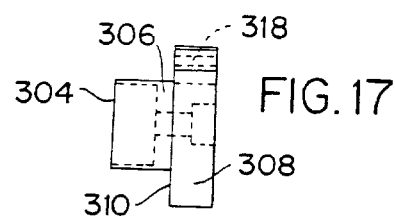
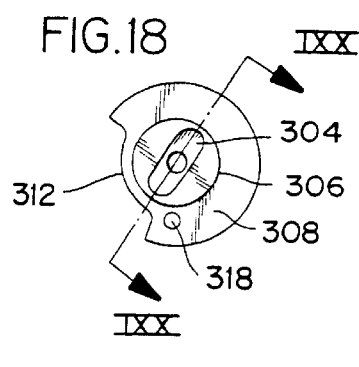
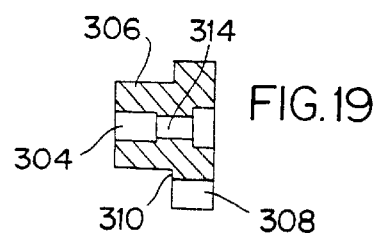

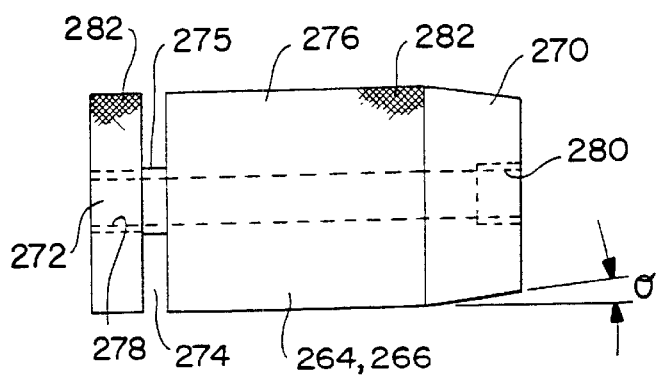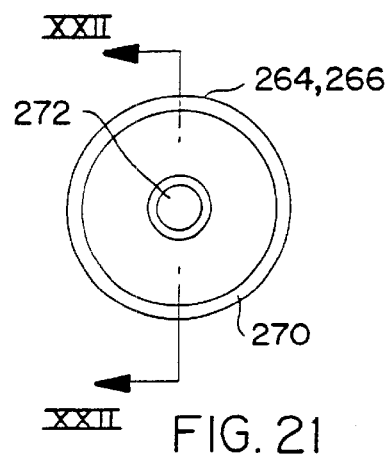
FIG. 20    FIG. 21
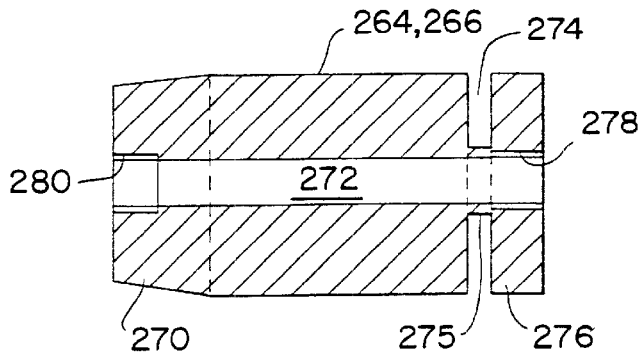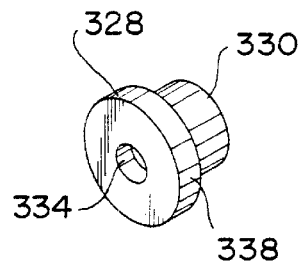
FIG. 22    FIG. 23
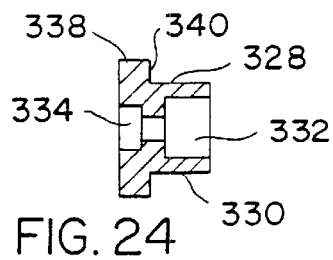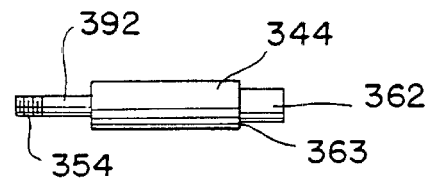
FIG. 24    FIG. 25
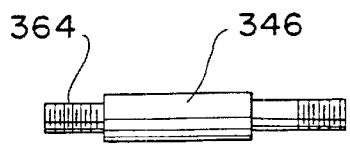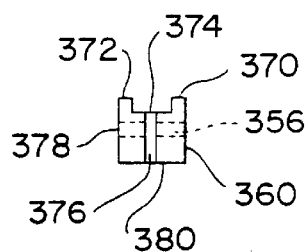
FIG. 26    FIG. 28

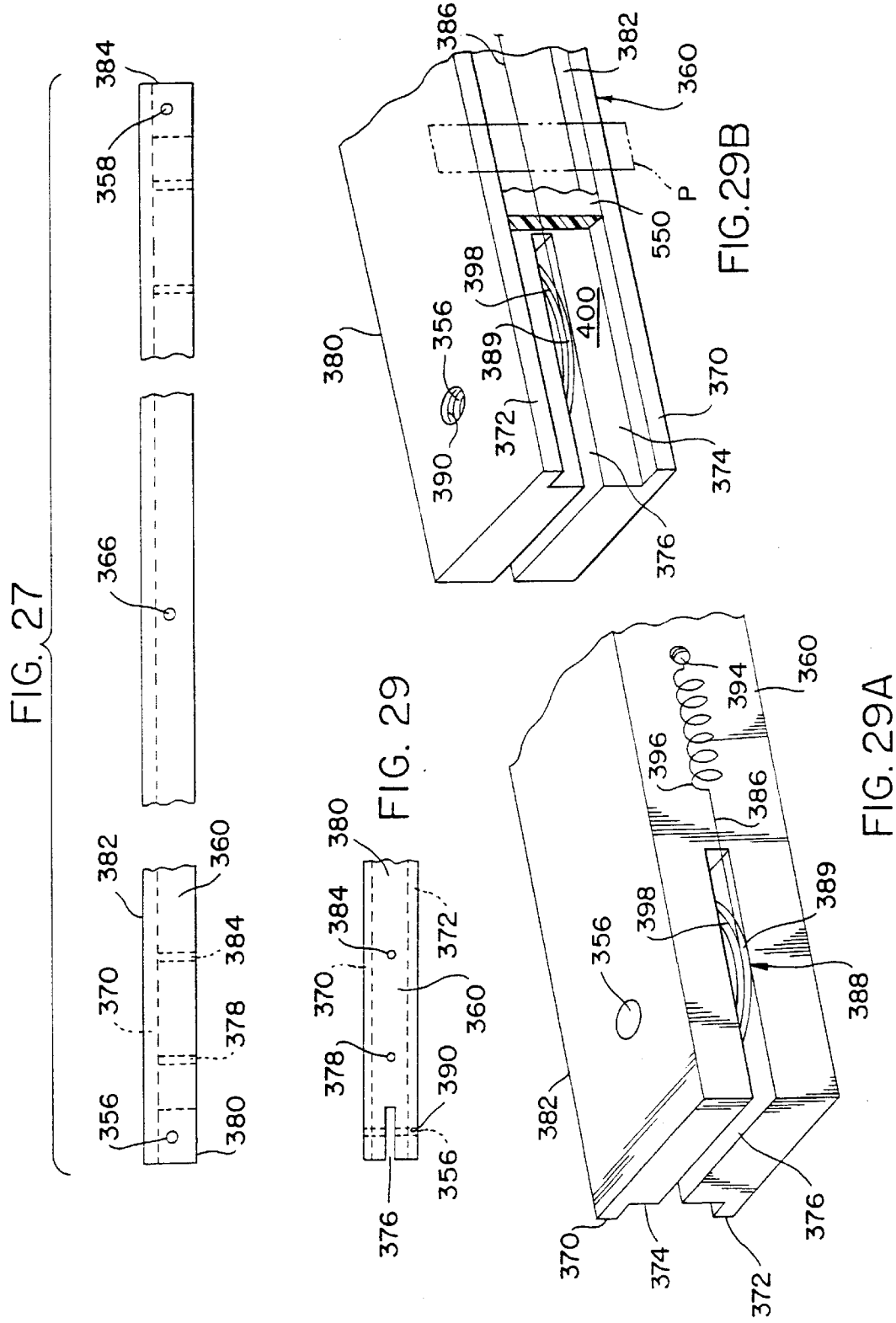

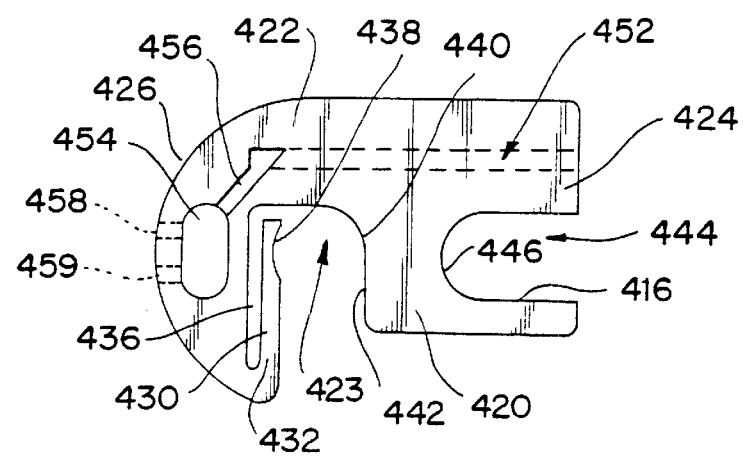
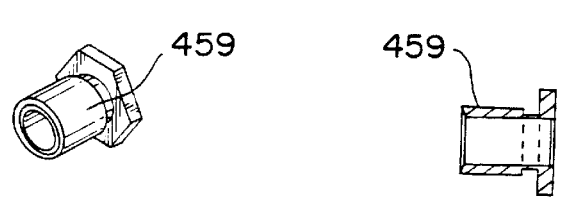
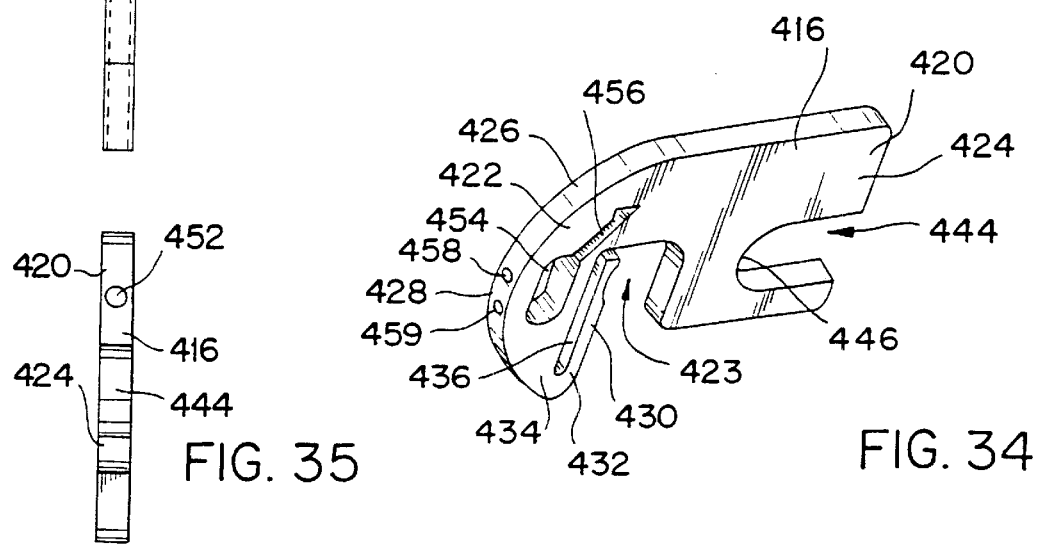
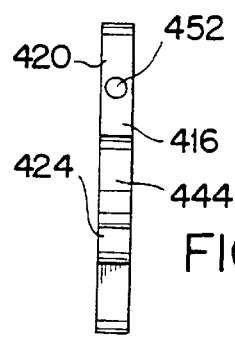

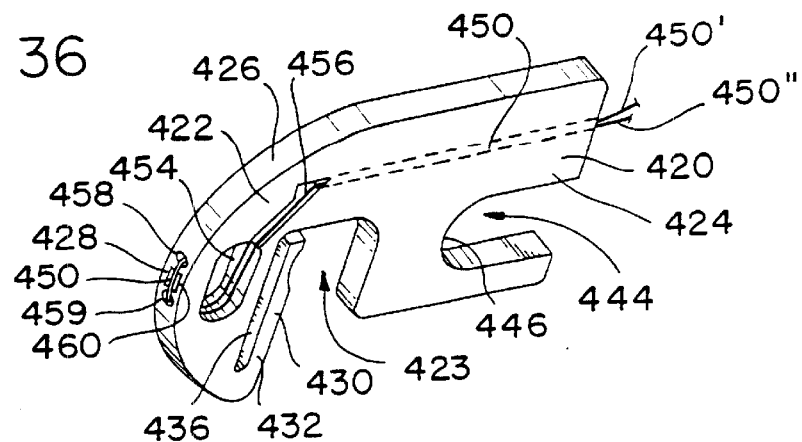
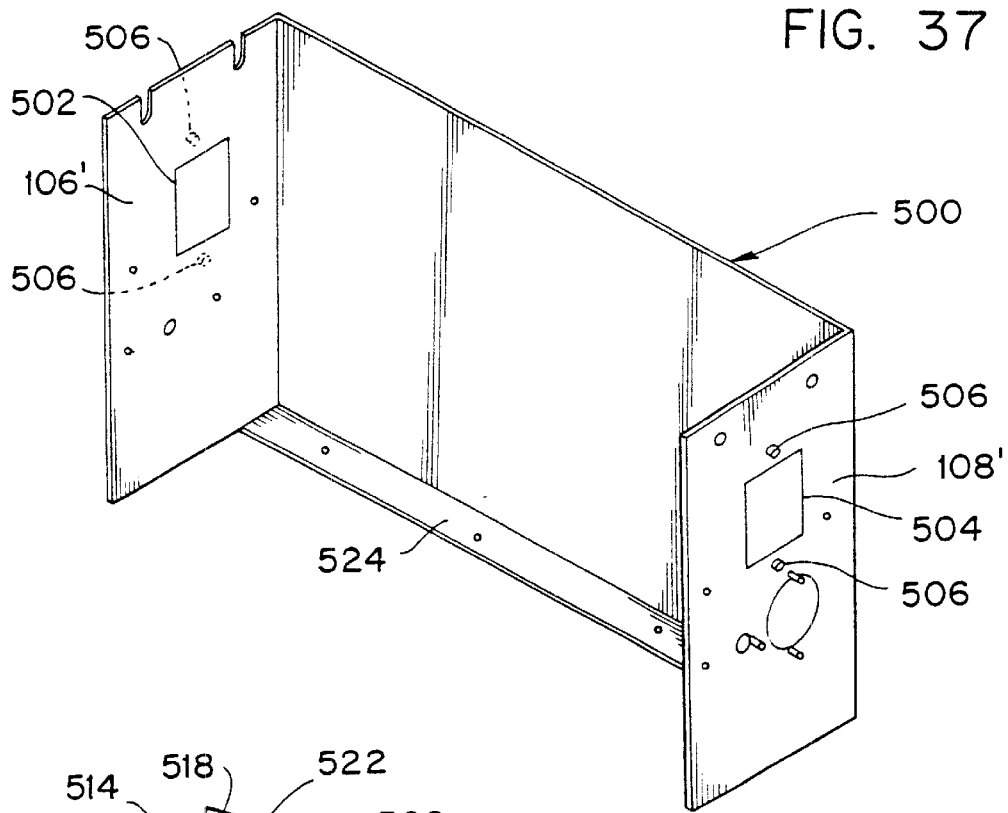
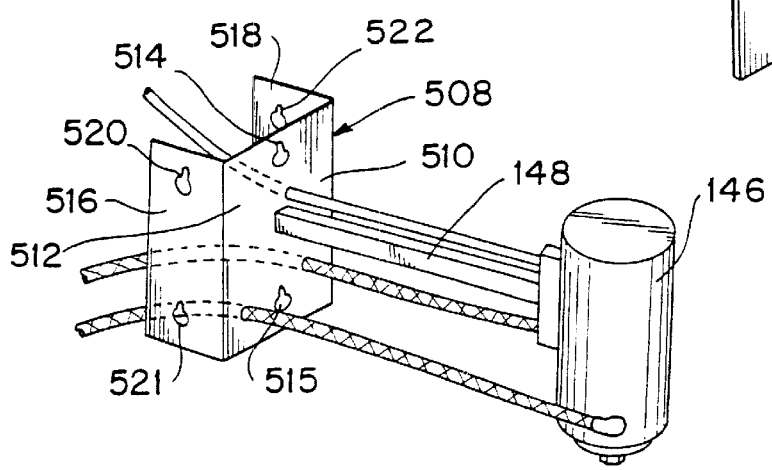

APPARATUS AND METHOD FOR PRODUCING BAGS AND FOAM-IN-BAG CUSHIONS

The present application is a divisional of U.S. Ser. No. 09/076,087 filed on May 12, 1998, now U.S. Pat. No. 6,178,725 which prior application is incorporated herein by reference.

FIELD OF THE INVENTION

The present invention is directed at a method and apparatus for producing bags preferably from a roll film source and preferably for use in producing foam cushion bags.

BACKGROUND OF THE INVENTION

In the packaging industry, a variety of devices have been developed to automatically fabricate foam filled bags for use as protective inserts in packages. Some examples of these foam-in-bag fabrication devices can be seen in U.S. Pat. Nos. 5,376,219; 4,854,109; 4,983,007; 5,139,151; 5,575,435; 5,679,208; and 5,727,370.

In addition to the common occurrence of foam dispenser system lock up or poor mix performance in prior art foam-in-bag systems, the film supply, tracking, sealing and feed components of prior art foam-in-bag systems also represent particular sources of headaches for operates of prior art devices. The headaches include, for example, attempting to understand and operate a highly complicated, multiple component assembly for feeding, sealing, tracking and/or supplying film (often C-fold) to the bag formation area; high breakdown or misadjustment occurrence due to the number of components and complex arrangement of the components; high service requirements (also due in part to the number of components and high complexity of the arrangement in the components); poor quality bag formation, often associated with poor tracking performance, particularly with respect to C-fold film supply systems which have a different type of side edge arrangement (unconnected versus connected edge) that is inherently prone to difficult maintenance of good tracking characteristics; vent hole blockage and/or product contamination from foam exiting the vent(s); and lack of versatility in regard to vent length and vent location.

Another particularly problematic area associated with the prior art foam-in-bag system lies in the area of heated resistance wire replacement, both in regard to edge sealing and in regard to the cross-cutting sealing systems. In the prior art systems, there is often required delicate operator manipulation with certain tools to achieve removal and reinsertion of broken, or worn, heated wires (which is a common occurrence in the thin heated resistance wires used in the industry to form the seals).

In addition, prior art systems suffer from other drawbacks, such as relatively slow bag formation and a slow throughput of completed bags which, in some systems, is partially due to a reverse feed requirement to break an upper, no-yet-completely formed bag from a completed bag with one or both adhered by the bond formed between the earlier melted and presently cooled plastic material on the heated cross-cut wire.

SUMMARY OF THE INVENTION

The present invention is directed at providing a bag forming assembly which helps to avoid or lessen the effect of the numerous drawbacks associated with the prior art systems such as those described above. In so doing, the present invention presents a highly versatile machine that provides numerous advantageous features without invoking added complexity and added components, which is a common tendency in the prior art systems, particularly of late. These advantageous features of the present invention include, for example:

a) the formation of bags through use of a single supply roll source which is a two-ply supply roll containing a two layer supply of rolled independent sheets;

b) a dual function motor that acts to drive the drive roller of the present invention and, at the desired point in time, also drives a pivoting cross-cut bar to a cross-cut formation location from a standby location and vice versa, to avoid the requirement for a secondary activation system for forming the cross-cut and the added complexity associated therewith;

c) an automatic bag/cross-cut wire separation feature which avoids the common prior art requirement of providing a reverse feed movement in the bag film supply;

d) biased edge seal inserts which apply constant pressure against the side edges of roll film material being passed between the edge sealers and drive roller of the present invention for facilitating constant contact and for creating a drag effect which provides a self-cleaning function as tube film is dragged past the heated wire component of the heating unit;

e) an easily removable and installable pair of edge seal inserts for easy edge seal heat wire maintenance and which have a reduced electrical current/power source demand, and in a preferred embodiment, feature plug-in cartridge heat units for even easier edge seal heat wire maintenance;

f) a continuous and uninterrupted edge seal arrangement which is preferably adjustable with the driven roller and provides a non-leak seal for the full longitudinal length of the bag and preferably along both sides;

g) a vent former that is also preferably supported by the driven roller and preferably includes a heat cutter positioned inward of the permanent edge sealer and circumferentially above the edge sealer heat unit (and thus above the nip) so that the heat cutter cuts a vent in only one of the two plies such that foam contamination of packaged products can be avoided through strategic positioning as to which side of the bag faces the container and which side faces the product;

h) a vent former arrangement which allows for easily varied vent lengths, longitudinal vent positioning to suit specific packaging requirements, the option of forming a vent only on one side or on both sides, vent formation in only one face of a formed bag (a feature that provides advantageous versatility in contamination avoidance) and the ability to avoid edge fold over vent blockage, and the avoidance of seal breaks due to an inward positioning of the vent hole with respect to a continuous side edge seal;

i) a driven wheel/edge seal insert/vent former combination which is easily laterally adjustable together so as to achieve a desired opposite edge seal spacing and vent formation positioning for a variety of bag width sizes;

j) a downstream "pull down" feed system which avoids the complication of attaching a driver to the roll supply (typically an inserted roll core driver) and providing an active braking system, and which can utilize merely an inactive friction enhancement system in an upstream support roller;

k) a knurled driven roller pair which, together with a compression relationship with the drive roller, helps maintain a non-slip tension in the two-ply film stack being pulled down through the system;

l) a rapid bag formation and bag throughput system which is particularly advantageous for use with a high throughput foam dispenser system, to provide not only an increase in foam-in-bag formation production, but the ability to provide improved foam expansion efficiency (i.e., more ft$^3$. in foam per lb. of chemical due to the avoidance of pouring new foam mix onto earlier poured and beginning to expand foam mix) as well as the benefit of being able to insert bags into an area of use before the foam-in-bag significantly converts from its cream state to a rapid rise state;

m) a control system that provides, partly in conjunction with the dual purpose single motor feature of the present invention, a highly efficient and easily manipulated roll-film bagger (e.g., bag length characteristics coordinated with the foam input timing and vent positioning and length options);

n) an easily serviceable cross-cut heated wire system which avoids inefficient service down time in a manufacture cycle as it provides an order of magnitude difference in cross-cut change time;

o) a significant lessening of the number of overall components due in part not only to the dual function motor described above, but also to other features such as the use of the drive roller itself as a back support means for the film supply being pinched by the cross-cut bar during the cross-cut/seal step of the present invention;

p) a compact system which is due in part to the lessening of components discussed above, placement of the dual function drive motor and one-way clutch within the interior of the drive roller, and the avoidance of a requirement for a tracking system above the roller and/or the requirement for an active-tensioning system and/or the requirement for an active film braking and feed system at the roll supply location;

These and other advantageous features of the present invention will become more apparent following a review of the summary discussion below describing the preferred embodiments of the present invention and the detailed discussion that follows.

The present invention features a bag forming apparatus that includes a film drive assembly which comprises a driver and a film drive wheel that is driven by said driver; a film cross-cut device; and a drive transmission system which interconnects said film cross-cut device to said driver such that said driver is adapted to both drive the drive roller and drive said film cross-cut device. The cross-cut device is supported by said drive transmission system such that said driver moves said cross-cut device into a pinch relationship with said drive roller wherein film fed by said drive roller is pinched between said cross-cut device and said drive roller to facilitate cross-cut formation. Preferably, the driver is a motor received within an internal cavity of said drive roller.

A support framework supports said drive roller and said drive transmission system, and said drive transmission system includes a motor mount that is connected with said motor and pivotally received by said support framework and a cross-cut device support assembly that includes a pivot support member pivotally received by said support framework and an interconnector extending between said pivot support member and cross-cut device. The drive transmission system further comprises a sub-drive transmission system which places said motor mount in driving communication with said pivot support member such that rotation in said motor mount causes rotation in said pivot support member, interconnector and connected cross-cut device. In this way, the pivot support member, interconnector and cross-cut bar are positioned with respect to said drive roller such that upon rotation of said motor mount in a first rotation direction said cross-cut bar swings from a stand-by position into a pinching relationship with respect to said drive roller such that film material fed by said film drive roller is pinched between said cross-cut device and said drive roller to facilitate cross-cut formation in the film material. However, upon a reverse rotation of said motor mount in a second rotation direction, said cross-cut bar rotates from the pinching relationship to said stand-by state, and the angle of rotation between an uninterrupted film feed supply plane and the stand-by state is greater than the angle of rotation between said feed supply plane and the pinching relationship such that automatic film separation is facilitated. The cross-cut device preferably includes a heated wire cross-cut former (and sealer) which is supported by a cross-cut bar and has a length essentially equal to or less than that of said drive roller along the drive roller axis of rotation with the wire suspended above a groove formed in an elongated cross-cut bar and within which groove a heat dissipating pad is preferably positioned. The cross-cut wire is bent around end wheels supported by the cross-cut bar and held by a fastener extending into the back of the bar. Thus, the film drive assembly preferably includes an elongated drive roller which is dimensioned to contact an intermediate portion and side portions of film material being fed by said drive roller and provides the back support component for the pinching operation of the cross-cut device.

The bag forming apparatus also preferably comprises a pair of driven rollers and a driven roller support rod which places said driven rollers in a compression relationship with respect to film fed by said drive roller, and said driven rollers being pivotally supported by said support rod and also in sliding friction contact with said support rod so as to facilitate film width adjustments in said driven rollers along a length of said support rod. The support rod is also connected to said cross-cut device and rotatable by said drive transmission system without invoking rotation in said driven rollers when said driven rollers are in said compression relationship with respect to said drive roller and film fed by said drive roller. The preferred embodiment of the present invention is directed at foam-in-bag type bag formation from a two-ply supply roll of film material, although other bag types can also be utilized (e.g., a tube film supply) with the appropriate modifications to the highly versatile system of the present invention. The present invention preferably features a first edge sealer and a first of said pair of driven rollers includes an intermediate slot for reception of said edge sealer. In a more preferred embodiment, the bag forming apparatus further comprises a second edge sealer received within a slot formed in a second of said pair of driven rollers. Also, each edge sealer preferably has biasing and engagement means for engaging the pair of driven rollers so as to be biased outward from said driven roller and toward said drive roller in floating fashion.

In an alternate embodiment of the present invention each driven roller is designed to support two card-like inserts with an outer one having means for forming a continuous edge seal and an inner card having means for forming a vent inward of the edge seal. The inward positioned vent hole former is preferably a heat unit cutter or (less preferably) a blade or sharp edge cutter and is preferably positioned a few inches inward of the continuous, permanent edge seal. The vent hole former, in addition to being inward of the edge sealer, also has an upstream contact location such that the heat cutter only comes in contact with a single sheet of the film material before that single sheet reaches the drive roller nip location. Thus, with this arrangement a vent hole is formed only on one side of the bag such that foam contamination of a product can be avoided by positioning the vent so as to face the package or container and not the product being protected.

Also, through use of an appropriate operator interface with the controller, an operator can adjust the longitudinal length of the vent hole based on the duration of heating time in the vent hole former and also the location of the vent hole with respect to the longitudinal length of the bag by choosing the heat on and heat off points between the bag's upper cross-cut seal and lower cross-cut seal's location. Thus, a series of vent holes can be formed, if desired, along the longitudinal length of the bag of a variety of lengths through appropriate vent starting points and heat duration control. Further, under the unique venting system arrangement of the present invention, an operator can easily set the vent hole forming system so that only one side is effected by the vent hole former, while the other side is not vented. This also increases the versatility in the matching of the appropriate vent configuration in the bag with respect to the product being protected. Alternatively, under the versatile design of the present invention, one vent former insert can be replaced by a secondary edge sealer card, such that an additional longitudinal seal can be formed inward of the outer edge seal along at least one side of the bag (possibly both if an alternate top-center vent formation design or a third insert arrangement is utilized as discussed below).

Rather than two separate inserts for the edge sealer and vent former, the present invention also features a single dual function insert wherein the insert's single main body supports body an edge sealing forming means (e.g., an edge sealer plug-in heat unit) at a nip level and a vent forming means (e.g., a second plug-in heat unit or cutter blade) positioned at a location on the main body that is above the edge sealer forming means. Although the vent forming means is preferably positioned inward of the edge sealer forming means (e.g., $1/16$ to $1/4$ inch) in this common support embodiment, in an alternate, less preferable, embodiment the vent former and edge sealer heat units can be placed along a common vertical plane (and preferably along a common arc of a curved face of the main body support), as despite the continuous and uninterrupted operation of the edge sealer, the vent hole forming means forms a vent hole that typically is large enough as to not be sealed by the downstream continuously running edge sealer. From the standpoint of avoiding the possibility of vent hole blockage due to edge curl over during packaging, the more inward, separate insert arrangement is more preferable; although it involves another insert card on each driver roller.

In a preferred embodiment, the film drive roller represents the only film driving means of said bag forming apparatus. Thus, the single, elongated cylindrical drive roller pulls the film material from its supply source toward it and past it. Because the drive roller represents the only driving force on the film, the supply film source can be a roll of film that is merely placed on the bag forming apparatus loosely and without active braking or a roll rotation feed means. The bag forming apparatus of the present invention also preferably comprises a one-way rotation device that is arranged so as to allow rotation of said drive roller in a film drive direction and to prevent rotation of said drive roller in a non-film drive direction. The driver includes a reversible motor, a drive shaft and a motor housing, and said motor, drive shaft and motor housing are arranged such that, upon reversing said motor to rotate said drive shaft in a non-film drive direction, the blockage of rotation of said drive roller by said one-way rotation device leads to rotation blockage in said drive shaft and rotation of said motor housing to initiate a driving of said cross-cut device. The drive transmission system includes a rotatable cross-cut support rod that extends adjacent said drive roller and a cross-cut connector that connects the cross-cut device to said cross-cut support rod such that, upon rotation of said cross-cut support rod by said drive transmission system, said cross-cut device is swung upward and into a film pinching relationship with said drive roller. Preferably, the drive roller includes a compressible outer layer supported by a less compressible inner roller unit, with the outer layer being high heat resistant and capable of rapid heat dissipation with silicone being suitable. Preferably, the drive assembly, drive transmission, and driven support rod are interconnected such that, upon a switch in said reversible roller from a non-film drive rotation direction back to a film drive rotation direction, said cross-cut bar is first swung back from the pinching relationship to a stand-by state prior to a driving of the film roller.

The aforementioned support for the roll of supply film preferably comprises a single roll supply support assembly having two rotatable support rollers arranged for direct contact with a single supply roll of film material and a passive braking device for preventing inertia induced over rotation of said support rollers when said drive roller discontinues pulling on film material from said supply roll. The passive braking device can include a loop of friction material extending about one of said rotatable support rollers and having an extension which facilitates non-rotation of said loop with said roller. An example of such an extension includes a second loop of friction material extending around a second of said rotatable support rollers. The first and second single supply roll support rollers are spaced close enough together to receive and hold thereabove the single roll of film material despite more than at least a majority of the film having been fed from the roll. As noted, the rotatable support rollers preferably represent the sole points of contact of said bag forming apparatus with the supply roll, and there is not a requirement for confinement means along the axial direction of the supply roll.

In a preferred embodiment, the single roll is a single roll of two ply film material (i.e., each side edge not connected). With such a supply, the bag forming apparatus includes a first ply path forming member positioned below a first of said single roll support rollers and a second ply path forming member positioned below a second of said single roll support rollers with said first ply path forming member being positioned to facilitate the feeding of a first ply from the single supply roll, which is a two ply single roll of film material, from a first contact location with said first roll support roller, outwardly past said first supply member and into a nip location formed between said drive roller and said driven rollers, and said second ply path forming member is positioned to facilitate the feeding of a second ply from the supply roll from a first contact location with said second roll support roller, outwardly past said second ply feed member and into the nip location formed between said driven and drive rollers. Thus, in one embodiment of the invention, a bag forming apparatus is provided that comprises a single two ply film material supply roll and a support assembly for supporting said single supply roll such that each ply of said two ply film material is feedable into driving contact with said drive roller from opposite, external front and back sides of a support framework.

A preferred interrelationship for one embodiment of the present invention features a bag forming apparatus that has a film material drive roller with a continuous widthwise film material contact surface featuring an intermediate portion positioned between two side edge portions. The intermediate portion of the drive roller is designed for contact with an intermediate portion of film material to be fed by said drive roller and the two side edge portions of said drive roller are designed for contact with respective edge portions of the film material to be fed by said drive roller. Thus, the pair of driven rollers are positioned so as to be driven by said drive roller together with the feeding of the film material by said drive roller, and said pair of driven rollers are spaced apart along the length of said drive roller so as to provide a bag fill clearance area or space therebetween providing a suitable location for receiving a foam mix whether the dispenser directs it straight down into a cross-cut seal formed by a cross-cut device either in common with a vertical plane that passes through the nip or more preferably an offset arrangement which is within a range of an inch or so from that plane toward the driven roller side. The outlet of the dispenser can also be tilted at an angle (e.g., <10°) either to the left or right along the cross-cut wire seal direction or in a transverse front to back relationship, although a vertical angle (no tilt angle) with ⅛ to ¼ inch offset toward the driven side arrangement is preferred. The cross-cut device is driven by a cross-cut device position adjustment assembly which drives said cross-cut device into and out of contact with film material that is in a feed relationship with respect to said drive and driven rollers for forming a cross-cut in the film material in the feed relationship.

At least one of said drive roller and driven rollers includes a compressible material outer layer and said driven and drive rollers are in a compression relationship while in a film material driving mode, and, preferably, at least one of said drive and driven rollers is of less compressible material than the drive or driven roller having the compressible material outer layer. The driven rollers are slideably adjustable along said support rod arrangement to accommodate different bag width formation modes. The support rod supporting said cross-cut device operates such that said cross-cut device is pivoted about an arc between a standby state removed from said drive roller and a cross-cut formation state wherein said cross-cut device is in a film material pinching relationship with said drive roller.

The present invention is also directed at a pair of edge seal members releasably supported on said driven rollers and adjustable in relative spacing with said driven rollers. The edge seal members have a recessed hook section which frictionally engages a reception component of said driven rollers with said friction engagement represents a sole means of engagement of said edge seal members with respect to said driven rollers such that hand removal and insertion of the edge seal members is easily achieved.

In one preferred embodiment of the present invention, the bag forming apparatus is a foam-in-bag type bag forming apparatus. Thus, in this embodiment, the support framework supports a foam mix dispenser and a foam mix dispenser device support assembly. Preferably, said support framework includes a first passage opening formed in a first side wall thereof which passageway is dimensioned larger than said dispenser to allow for insertion and removal of said dispenser and dispenser support assembly, and said dispenser device support assembly includes a cover plate and support framework engaging means for non-tool disengagement of said dispenser support assembly from said support framework. The support framework also features a second side wall having a second passageway formed therein which is similar to the first passageway at least insofar as being able to receive said dispenser.

Also preferred embodiments of the film edge sealer and below described vent former feature a main body that has a capture recess formed therein which is dimensioned for frictional attachment to a support component of a bag film support assembly positioned adjacent film material being fed therepast during operation. The edge sealer and vent former further each comprise a heating unit supported by said insert main body, and the main body has a thin, card-like configuration and the heating unit is formed along a relatively short extension of an exposed peripheral side edge of said main body.

In the edge sealer, the heating unit is positioned so as to contact the stacked film material at the nip location or sufficiently close enough thereto to band the two sheets of film material together. The vent former has a different positioned heating element as compared with the edge sealer as it is positioned on the peripheral side edge of the supporting main body further up and backward along the curved front face of the main body. This positioning of the vent former heat unit (or blade) ensures that only one of the film material sheets is effected as it comes in contact with only a single sheet prior to two sheets sufficiently merging near the nip location into a position that could undesirably melt or slice the second sheet. The present invention can feature an arrangement wherein both films are effected by the vent former, but this results in a loss of the numerous advantages described herein such as being able to form a vent in only one side of the bag. The heating unit is preferably a plug-in unit similar to an automobile plug-in fuse or of another design such as an extension of a heating wire that extends from an outlet opening in said exposed peripheral edge, and returns through an inlet opening in said exposed peripheral edge spaced less than an inch from said outlet opening. Also, the main body's capture recess includes a biasing device therein, wherein said biasing device is preferably a lever extension of said main body having an interior edge positioned for contact with the support component and an exterior edge separated from a remaining portion of said main body. The interior edge also preferably includes a concavity opposed to another concavity on an opposite wall of the capture recess with the facing concavities designed to engage a cylindrical, internal bar section of a driven roller and cause the lever to deflect outward and to have a floating function. The aforementioned plug-in heating unit preferably features a cartridge that has a plug-in base designed for plug-in reception by the reception opening of said main body and a heating unit supported by said base.

A preferred embodiment of the present invention is a particular compact design partly due to the drive roller unit utilized which has an elongated main body having a first cavity for receipt of a motor therein. The first cavity is formed at one end of said main body and said main body includes a second cavity at an opposite end of the drive roller and which receives a one-way rotation mechanism.

The present invention is also directed at a method of forming a bag which comprises feeding a first ply of a two-ply single roll of film along a first path to a film feed mechanism; feeding a second ply of the two-ply single roll of film along a second path and into contact with said first ply at said film feed mechanism; forming opposite edge seals in the first and second ply of material; and forming a cross-cut seal in the first and second ply of material. In a preferred method, the bag being formed is filled with foam and thus said method further comprises feeding a foam mix to said bag by injecting foam into a location above the cross-cut seal and prior to complete formation of side edge seals in the bag currently being supplied with foam mix. The method of the present invention further includes the formation of a cross-cut seal which involves bring a cross-cut device into a pinching relationship wherein said first ply and said second ply which are pinched between the cross-cut device and a drive roller of said film feed mechanism. The method of the present invention also preferably comprises using a common drive source to both drive said drive roller and move said cross-cut device. The foam mix input is initiated essentially simultaneously with cross-cut seal formation and without a reversing of the two plies of film earlier fed to said feed mechanism. Also, feeding of said first and second plies includes feeding with said feed mechanism which includes a single drive roller which supplies all driving force with respect to the two plies of film. Preferably, the feeding step includes pinching said first and second ply between said single supply roller and a pair of spaced driven rollers, and said method further comprises feeding a foam mix within a foam reception clearance space between the two plies that lies between said driven rollers at the level of said drive roller.

In a preferred method of forming a bag, the driving of said drive roller and shifting of said cross-cut device is conducted with said motor while said motor is received within a cavity of said drive roller. Under this method, the feed mechanism includes a drive roller and a pair of drive roller in driving engagement with said driven rollers and said film material is passed between said drive roller and driven rollers and said motor drives a drive shaft connected with said drive roller and said motor includes a housing and is a reversible motor; and said feed mechanism includes a one-way rotation device; and said drive roller drives the film material while rotating in a first direction and said one-way rotation device precludes free rotation of said drive roller in an opposite direction to said first direction when said motor is reversed in driving direction and this precluding of said drive roller rotation causes a preventing of rotation of the drive shaft of the motor and a consequential rotation of said motor housing as well as a driving of a transmission system which is connected with said cross-cut bar to implement said shifting of said cross-cut bar. The method further comprises returning the motor to a first drive direction mode and wherein upon return thereto said cross-cut bar is rotated away from a cross-cut formation location to a stand-by state prior to drive roller movement and said rotation of said cross-cut bar to said stand-by state causes a separation of a prior formed bag from a currently being formed bag along a cross-cut seal formed by said cross-cut device.

BRIEF DESCRIPTION OF THE PREFERRED EMBODIMENTS

FIG. 5 shows a left end elevational view of that which is shown in FIG. 4;

FIG. 6 shows a front elevational view of that which is shown in FIG. 4;

FIG. 7 shows a right end elevational view of that which is shown in FIG. 4;

FIG. 8 shows a cross-sectional view of the drive roller assembly of the present invention (except for the motor assembly and clutch shaft shown in full);

FIG. 9 shows an exploded view of the motor mount assembly of the drive assembly shown in FIG. 8;

FIG. 9A shows a side elevational view of the motor mount of the motor mount assembly in FIG. 9;

FIG. 9B shows an end elevational view of the left end of the motor mount shown in FIG. 9A;

FIG. 9C shows a cross-sectional view taken along line XI—XI in FIG. 9B;

FIGS. 9D–9F show a side elevation view and two end views of the drive roller coupling of the motor mount assembly in FIG. 9;

FIG. 9G shows a cross-sectional view of the drive roller coupling taken along cross-section line X—X in FIG. 9E;

FIGS. 9H and 9I show a side elevational view and a front elevational view, respectively, of the drive roller bushing of the present invention;

FIG. 10 shows a cross-sectional, cut-away view of the one-way clutch/bearing assembly of the drive assembly shown in FIG. 8;

FIG. 11 shows a perspective view of the bearing shaft of the one-way clutch/bearing assembly of FIG. 10;

FIG. 12 shows the connection assembly for connecting the cross-cut bar, motor and drive roller assembly of the present invention with the drive roller in a drive state and the cross-cut bar in a disengaged state;

FIG. 13 shows the connection assembly of FIG. 12 with the drive roller assembly locked and the cross-cut bar in cross-cut contact with the drive roller;

FIG. 14 shows the cross-cut support rod of the present invention;

FIG. 14A shows an end view of the right side of the cross-cut support rod of FIG. 14;

FIG. 15 shows a perspective view of the cross-cut rod mount of the present invention;

FIG. 16 shows a top plan view of the cross-cut rod mount;

FIG. 17 shows a side elevational view of the cross-cut rod mount;

FIG. 18 shows a bottom plan view of the cross-cut rod mount;

FIG. 19 shows a cross-sectional view taken along cross-section line IXX—IXX of FIG. 18;

FIG. 20 shows a front elevational view of one embodiment of a driven, side edge roller of the present invention;

FIG. 21 shows an inside end view of that which is shown in FIG. 20; and

FIG. 22 shows a cross-sectional view along cross-section line XXII—XXII in FIG. 21.

FIG. 23 shows a perspective view of a cross-cut rod bushing of the present invention;

FIG. 24 shows a cross-section view of the cross-cut rod bushing of FIG. 23;

FIG. 25 shows a side elevational view of an end stud of the present invention;

FIG. 26 shows a side elevational view of a center stud of the present invention;

FIG. 27 shows a cross-cut side elevational view of the cross-cut bar of the present invention;

FIG. 28 shows a left end view of FIG. 27;

FIG. 29 shows a back side, cut-away view of an end portion of the cross-cut bar in FIG. 27;

FIG. 29A shows a perspective, enlarged view of the end portion of the cross-cut bar;

FIG. 29B shows a view similar to FIG. 29A except the opposite, front side of the cross-cut bar is presented;

FIG. 30 shows a perspective view of a threaded plug;

FIG. 31 shows the plug of FIG. 30 in cross-section;

FIG. 32 shows the edge seal rod of the present invention;

FIG. 33 shows a plan view of an edge seal card insert of the present invention;

FIG. 34 shows a perspective view of the edge seal card insert of FIG. 33;

FIG. 35 shows an end view of that insert; and

FIG. 36 shows a perspective view like that of FIG. 34 except for the heated expose wire filament, cylindrical contacts and feed wiring in position.

FIG. 37 shows a view of a modified embodiment of the frame support structure shown in FIG. 4;

FIG. 38 shows a perspective view of a preferred embodiment for a detachable dispenser support assembly;

DETAILED DESCRIPTION OF THE PREFERRED EMBODIMENTS

Figure 1:
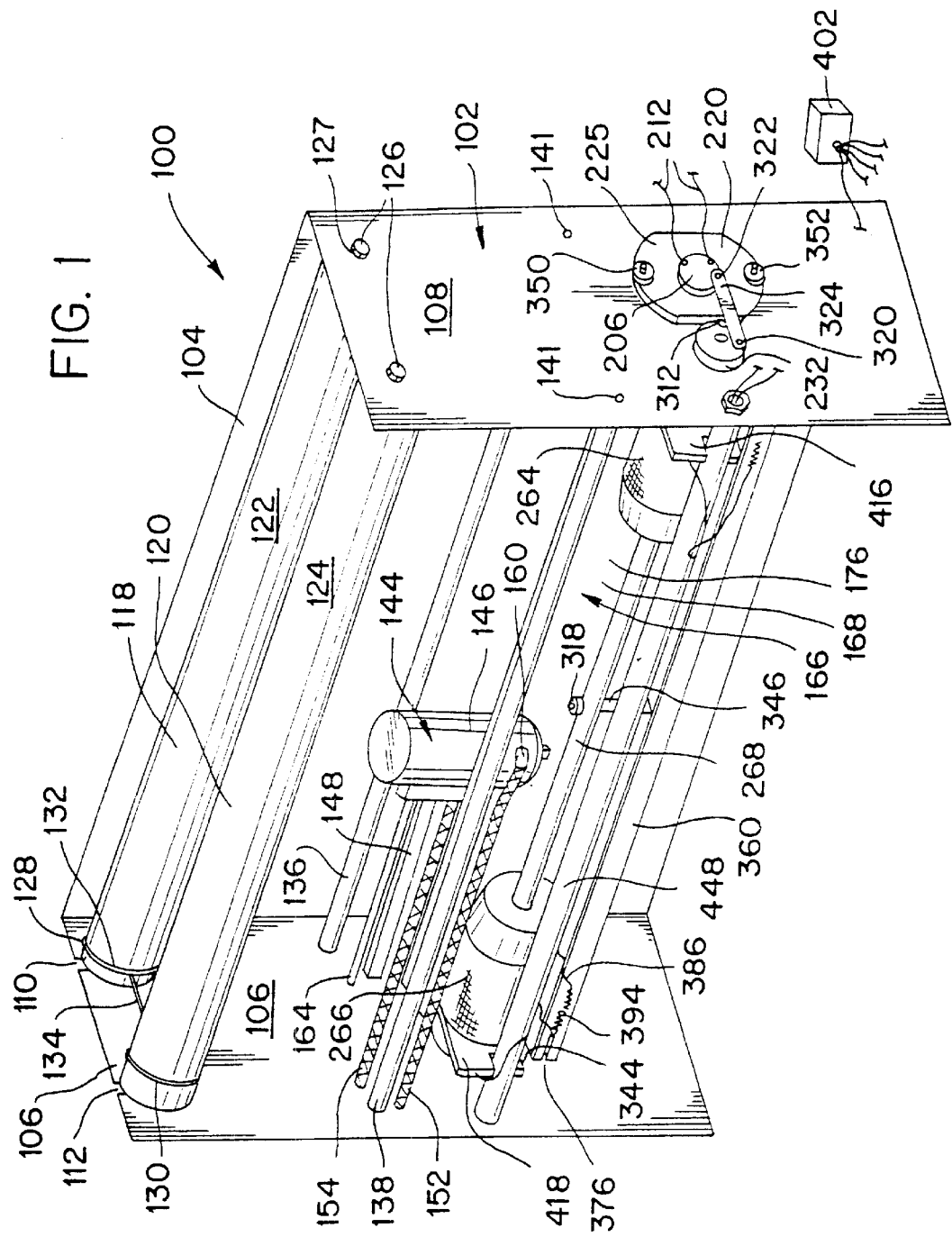
FIG. 1 shows a perspective view of a preferred embodiment of a roll film bagger of the present invention.

FIG. 1 shows a perspective view of a preferred embodiment of roll film bagger 100 of the present invention. As shown in FIGS. 1 and 4–7, roll film bagger 100 includes support frame structure 102 comprised of back wall 104, first side wall 106, and second side wall 108. Although not shown, additional coverings can be added either to frame structure 102 (e.g., a pivotable front cover and roll film top cover) or as a stand alone additional covering assembly.

Support frame structure 102 includes vertical slots 110 and 112 formed in wall 106 and corresponding support apertures 114 and 116 (FIG. 7) formed in second side wall 108. These support slots and apertures provide for easy installation of film roll support rollers 118 and 120. Supply film roll support rollers 118 and 120 preferably feature rotatable, outer cylinders 122 and 124 with closed ends supported on an internal, non-rotating support shaft through use of conventional end bearings. Each shaft 127 has multisided end projections 126 (only two of the four shown in FIG. 1), respectively received in slots 110, 112 and apertures 114, 116 to provide a pair of conveyor roller-like assemblies. FIG. 1 also illustrates passive tensioning and braking device 128 which includes an eyeglass-like configuration with loops 130, 132 each extending about an end of a respective film roll support roller. Tension device 128 also has intermediate member 134 extending between loops 130, 132. Tension device 128 is preferably formed of a relatively high friction co-efficient material (e.g., rubber or some other high friction elastomer) to provide a passive tensioning device in the film supply operation discussed in greater detail below. The high friction material also acts to prevent continued rotation upon a discontinuance of film feed and thus device 128 provides a passive braking effect upon termination of film feed downstream. Separate loops, which have extensions joined to a relatively fixed structure such as support frame structure 102, can instead be utilized although the integral pair facilitates quick installation and works in suitable fashion. A variety of other forms of tension and/or braking producing means are also possible including active tension and/or bracking devices such as those known in the art., although an inactive combination tensioning and braking device such as that disclosed is considered sufficient for operation in the present invention and avoids the introduction of a complicated and multi-component system. Other passive braking devices can be used in the present invention such as a biased (e.g., leaf spring) or fixed in position friction increasing device.

Figure 2:
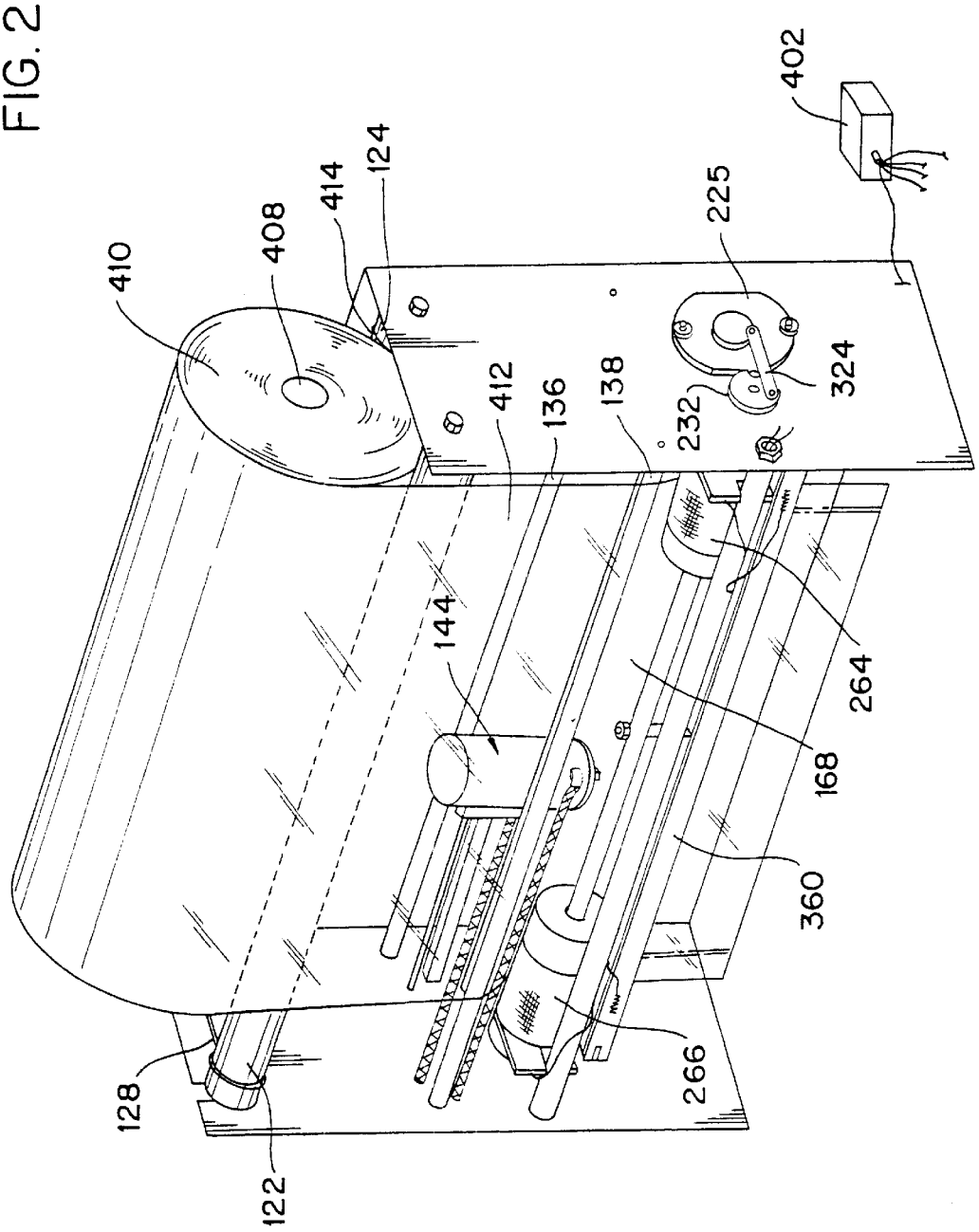
FIG. 2 shows the roll film bagger of FIG. 1 with a single roll of film in place.

Film roll support rollers 118 and 120 are spaced apart on support frame structure to support a single two-ply supply roll therebetween and above as shown in FIG. 2 and as described in greater detail below. The lateral spacing is sufficient to support the roll diameter at least for a majority of the supply.

As particularly shown in FIGS. 1, 5 and 7, a pair of film passage spacer bars 136, 138 are supported on support frame structure 102 by threaded fasteners 141 (only two of four fasteners shown in FIG. 1) which extend into threaded holes (not shown) provided at each end of spacer bars 136 and 138 and are aligned with holes 140, 142 in second side wall 108 and holes 140', 142' in first side wall 106. Thus, threaded fasteners 141 extend through the side walls 106, 108 in fixing the preferably non-rotating and otherwise solid cylindrical spacers bars 136, 138 in position on support frame structure 102. As can be seen by the relative spacing of holes 140, 142 to that of apertures 114, 116, spacer bars 136, 138 are laterally spaced further apart than the lateral spacing for the central axis of roll film support rollers 118 and 120. In this way, film sheets supplied by the supply roll resting on rollers 118 and 120 are bent about or extend along the exterior surface of the spacer bars before being diverted inwardly as described in greater detail below.

With reference again to FIGS. 1, 4 and 5, positioned between and below spacer bars 136, 138 is dispenser assembly 144 which preferably includes a dispenser 146 such as that disclosed in PCT Application PCT/US/98/06508 to Carpenter Company, Richmond, Va., US which is incorporated by reference herein in its entirety. The roll film bagger of the present invention is, however, well suited for use with a variety of dispenser designs including internal foam precursor dispensers like that of the above reference PCT/US98/06508 application as well as external foam precursor dispensers which mix chemical external to the dispenser including in the bag itself (See for example U.S. Pat. No. 5,727,370). Apart from the inherent advantages in the internal mix dispenser described in the above reference PCT application, the internal mix dispenser described in the PCT application is particularly well suited for use with the present roll film bagger assembly 100 as its high throughput of mixed foam is highly compatible with the quick film supply feed an bag formation features of the present invention, and the foamed dispenser's internal solvent flush system avoids the persistent lock-up and service requirements of prior internal mix foam dispensers.

Dispenser 146 is shown in FIG. 1 suspended in an intermediate area of frame structure 102 by suspension rod 148 which is fixed by a suitable fastener (not shown) extending first through reception hole 150 formed in wall 106 and then into a threaded aperture in rod 148 forming part of the dispenser assembly. A suitable fashion hole arrangement can also be provided in the opposite wall 108 to allow for extension inwardly from that wall. Chemical "A" and chemical "B" supply conduits 152, 154 extend from corresponding supply sources (not shown), through wall holes 156, 158 and into communication with the dispenser's connectors 160 (only one shown). For the preferred embodiment for dispenser 146, there is additionally provided hole 162 and umbilical cord 164 for a solvent supply line and an air pressure line which cord is connected to dispenser 146. Although support rod 148 and the chemical and solvent/air reception holes and supply lines are shown extending from wall 106, the present invention, unlike the prior art devices which rely on a C-fold film supply, can just as easily have dispenser support rod 148 and the associated dispenser supply lines 152, 154, 164 extending inwardly from second side wall 108 instead of wall 106 (or even in addition thereto—e.g., a dual supply system with side-by-side vertical or tilted, centered outlets to enable, for example, a rapid switch over to different chemical types or added backup). As will become clearer below, this added versatility, in the present invention stems in part from the ability of the present invention to function with a single roll film supply that is a two-ply roll with unconnected side edges at both sides of the two-ply sheets on the roll.

FIGS. 37 and 38 show an alternate embodiment for support frame structure 102 and the means for positioning dispenser 146 in within the frame structure. As shown in FIG. 37, modified support frame structure generally has the same makeup as support frame structure 102, and thus, only the differences are discussed. On both walls 106' and 108', there is provided a dispenser passageway opening (502, 504) which is suitably sized to allow for the insertion and removal of dispenser 146 therethrough.

Provided above and below each of openings 502, 504 are key slot projections 506. While projections 506 are shown above and below, a single projection can also be relied upon and/or side projections or some other easy attachment and detachment means can be relied upon.

FIG. 38 shows a suitable dispenser suspension assembly 508 which is similar to the arrangement shown in FIG. 1 except that rather than relying on a threaded fastening of the end of dispenser suspension rod 148 through a hole in walls 106 and 108, dispenser suspension rod 148 is attached (e.g., permanently, such as through welding or by a removable threaded arrangement, etc.) to cover plate unit 510. The forward wall 512 of cover plate unit 510 has key holes 514 which corresponds to key projections formed in both walls 106 and 108 and is sized so as to preferably cover openings (502, 504) once the cover plate unit is in position. Cover plate unit 510 also includes corresponding passageway holes for the solvent/air supply umbilical cord and precursor supply lines. Thus, for insertion of dispenser 146 and all its supply lines all an operator needs to do is insert dispenser 146, suspension rod 148 and the internal portion of the supply lines through opening 502 (or 504) until projections 506 are received in corresponding key holes 514, 515 whereupon a release of suspension assembly 508 allows for key projection 506 to lock-in holes 514 with the assistance of gravity. A grooved and/or multisided projection 516 can be relied upon to avoid separation and/or rotation (e.g., if only one key slot/projection arrangement is utilized).

Further, by reversing the insertion steps, the suspension assembly 508 and dispenser can easily be removed. Cover plate unit 510 further includes side walls 516 and 518 with key holes 520, 521 and 522 (the additional bottom key hole on side wall 518 is not illustrated in FIG. 37). These additional side wall key holes 520, 521 and 522 and the one hidden from view provide a convenient servicing support means in that after withdrawal of dispenser, suspension assembly 508 out of hole 502 (or 504) and external to wall 106' (or 108') the operator need only remount assembly 508 so that the most convenient one of side walls 516, 518 is flush against wall 106' and such that assembly 508 extends forward (or back) of formed structure 500 so as to be readily accessible and easy to work on. The ability to easily insert and remove suspension assembly 508 through opening 502 and 504 also adds to flexibility when the work space is limited on one side or the other of frame structure 500. The added horizontal wall 524 of frame structure 500 is discussed below with respect to FIG. 39.

Figure 3:
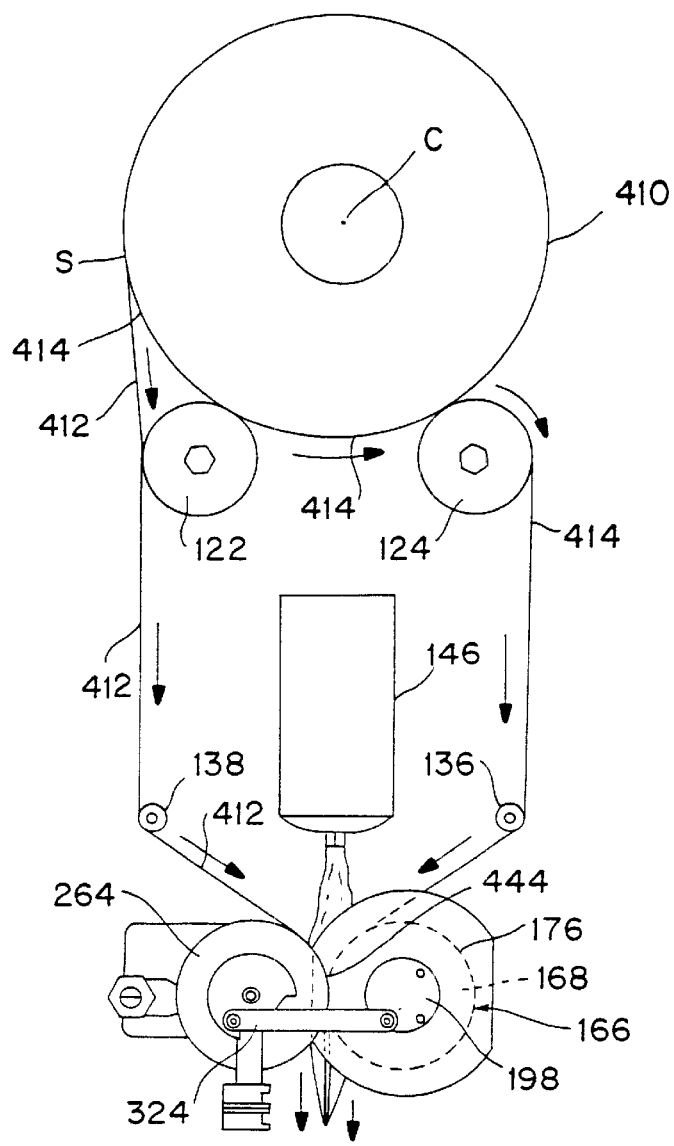
FIG. 3 shows a side view of the internal components of FIG. 1.
Figure 4:
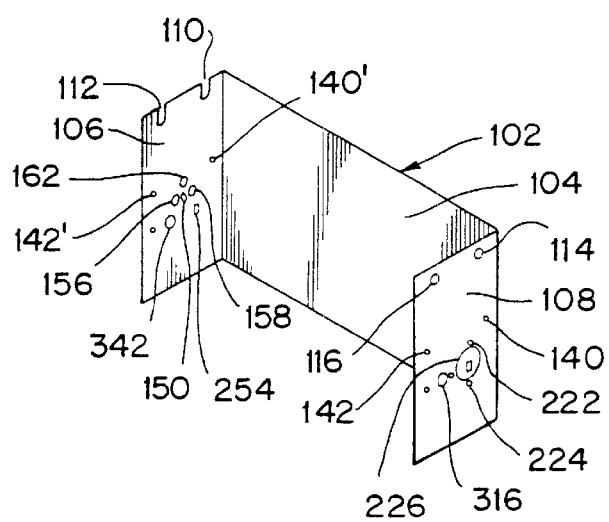
FIG. 4 shows a perspective view of one embodiment of the frame support structure.

As shown in FIGS. 1 and 3, positioned vertically below and laterally rearward of dispenser 146 is drive roller assembly 166. Driver roller assembly 166 is shown in cross section in FIG. 8. As shown in FIG. 8, drive roller assembly 166 includes a single, extended length drive roller 168 that is sufficiently long enough to provide a common drive source that extends for the full length (and beyond or just slightly short of) the width of the film being driven by the driver roller. This is different than many of the prior art assemblies that rely upon two pairs of spaced drive and tracking rollers to maintain proper tracking of the side edges of the film being driven through the system, which film being driven is typically either a single supply roll of C-fold film (gusset or non-gusset) or two spaced apart rolls of single ply film (gusset or non-gusset) that are brought together during travel through the bad formation system. The tracking equipment requirement in the prior art system stems from the inequalities that inevitably develop when two separate supply rolls are involved or because of the inevitable tracking inequalities that develop due to the differences between one edge formed of two independent film sheets and another edge formed of a folded over film sheet present in a C-fold single roll supply. These tracking problems are avoided in the present invention in the use of a two-ply single roll supply having both of its side edges comprised of independent, stacked film sheets which are accurately aligned initially in the roll itself and maintained sufficiently aligned under the film feed mechanism of the present invention. The manner of film passage and supply is discussed in greater detail below with reference to FIG. 3.

Drive roller 168 is preferably comprised of an internal cylinder member 170 such as a solid aluminum cylindrical body preferably having reception cavities 172 and 174 formed at opposite ends. Drive roller 168 further comprises a relatively softer, compressible material outer layer or coating 176. In addition to being a sufficiently compressible material and for reasons outlined in greater detail below, outer cover 176 also preferably is formed of material having a relatively high heat resistance and relatively high heat dissipation capability. A silicone material is considered to be a suitable material and preferably has a thickness of $\frac{1}{16}$ to $\frac{1}{2}$ of an inch (0.15–1.2 cm) and more preferably about $\frac{1}{8}$–$\frac{3}{8}$ of an inch (0.3–1.0 cm).

Reception cavity 174 is dimensioned to receive therein a portion of motor mount assembly 178 which is best shown by the exploded view thereof in FIG. 9. As shown in FIG. 9, motor mount assembly 178 includes motor assembly 180 which in the preferred embodiment includes a reversible, electric (DC) micro motor driver 182 in combination with a reduction gear head assembly 184. A suitable motor driver 182 is sold by Micro Mo Electronics, Inc., located in clearwater, Fla., in the United States under the MicroMo® motors brand. A suitable reduction gear assembly is also made available from Micro Mo Electronics Inc. under the MicroMo® gearheads brand (gearhead series 30/1).

Attached to the output shaft 186 is drive roller coupling 188 which has an internal rotation lock notch reception arrangement 190 (e.g., a D-shaped reception opening) which provides for axial snap coupling with the corresponding notched end 192 of shaft 186. Drive roller coupling 188 is rotationally locked within small diameter recess 194 formed at the internalmost end of reception cavity 174. FIGS. 9D–9G illustrate in greater detail a preferred embodiment for drive roller coupling 188 with FIG. 9D showing an end view of the end received on the base portion of the shaft and FIG. 9F the end into which the notched, free end of shaft 186 rests. FIG. 9G shows a cross sectional view taken along cross-section X—X of the side view present by FIG. 9E. The rotation lock between coupling 188 allows motor assembly 180 to drive roller 180 in either a clockwise or counter clockwise direction depending upon the control signal received from controller 402 discussed in greater detail below. Coupling 188 is received within small diameter recess 194 so as to be rotationally locked within cylindrical body 170 such as with a friction fit or some other engagement such as an adhesive and/or mechanical engagement (e.g., key/slot relationship). Outward of small diameter recess 194, reception cavity 174 further includes an expanded reception area portion 196 for reception of motor drive 182 and gearhead assembly 184 (the combination is referred to in some instances below as simply "motor" or "driver", with such terms also being applicable to systems without an attached gearhead such as when the motor has an internalized gear system for a similar output).

As best shown by FIGS. 8 and 9, motor mount assembly 178 further comprises rotatable motor mount 198 having cup shaped section 200 designed to receive the outer end 202 of motor housing 204 of motor 182 so as to rotationally lock motor housing 204 with respect to mount 198. Such a rotation fix can be achieved by an adhesive and/or friction fit and/or mechanical engagers such as threaded fasteners or a key/slot arrangement. FIGS. 9A–C further illustrate motor mount 198 with FIG. 9A showing a side view, FIG. 9B showing an end view (the end opposite to cut-shaped member 200) and FIG. 9C showing a cross-section taken along cross-section line XI—XI in FIG. 9B. As shown in these figures, motor mount 198 includes cylindrical rotation block 206 which has a smaller diameter than cup-shaped member 200 to form contact shoulder 208. Wire reception passageways 209 are formed in block 206 and extend from the outermost end 210 of block 206 and into the base of cup-shaped member 200 such that wires 212 (FIG. 9) of motor 182 can be connected to the appropriate wiring for energizing the motor based on control signals from controller 402. Block 206 further includes threaded reception hole 214 for receipt of a link connecting threaded bolt as described below.

As further shown in FIGS. 8 and 9, motor-roller bearing 216 extends around the circumference of block 206 and abuts against shoulder 208. Motor-roller bearing 216 helps facilities rotation of motor mount 198 and the coupled motor housing 204 (upon a locking of drive roller 168 and shaft 186 as explained further below). Motor-roller bearing 216 helps also to stabilize motor mount assembly 178 within drive roller cylinder 170 and can be in the form of a bearing cage with either external and/or internal contact bearings (e.g., ball, cylinder, etc.) supported thereby. Alternatively, motor-roller bearing 216 can take on the form of a low friction annular ring (e.g., TEFLON® material) which provides low friction resistance to be the moving motor mount.

Motor-roller bearing 216 is sandwiched between the aforementioned shoulder 208 of motor mount 198 and and interior ring 218 forming part of drive roller bushing 220. Drive roller bushing 220 is mounted on second side wall 108 by extending fasteners (or pins premounted on second side wall 108) through holes 221 and 223 of external bushing section 225 of drive roller bushing 220 and through corresponding threaded fastener holes 222 and 224 in wall 108 (FIG. 7). Interior ring surface 218 projects inwardly off from external bushing section 225 and is snugly received in a correspondingly sized hole 226 formed in second side wall 108. As shown in FIG. 1, block 206 has an axial length which provides for an extension of surface 210 to be essentially co-planar with cross-cut rod mount 232 shown in FIG. 1 to be spaced adjacent to external bushing section 225 on the exterior of second side wall 108. The function and arrangement of cross-cut mount 232 is described in greater detail below.

FIG. 10 shows in cut-away fashion the opposite end of drive roller 168 which includes reception cavity 172. Within reception cavity 172 is positioned rotation-lock assembly 234. Rotation lock assembly 234 is shown to include bearing unit 236, shaft 238 and one-way clutch 240.

FIG. 11 shows shaft 238 by itself and, as shown in FIG. 11, shaft 238 includes bearing extension end 240, middle section 242, and wall extension end 244. Wall extension end 244 includes cylindrical base 246 and key extension 248 with the latter extending outward away from base 246 so as to define shoulder abutments 250 which are placed in flush contact with interior surface 252 of first side wall 106. Key extension 248 is received in correspondingly shaped (rectangular in this instance) slot 254 formed in first side wall 106.

FIG. 10 illustrates annular-shaped bearing unit 236 surrounding bearing end 240 of shaft 238 and extending out into contact with the interior surface of cylinder body 170 defining reception cavity 172. Bearing unit 236 preferably feature inner and outer races 256, 258 with a plurality of ball bearings 260 therebetween to provide a free rotation and support function to cylinder body 170.

On the opposite side of middle section 242 of shaft 238 is positioned means for allowing rotation in one direction and for preventing rotation in the opposite direction which, in a preferred embodiment, is in the form of one-way clutch 262 shown in FIG. 8 and 10. A suitable one-way clutch is a Marland-Ringspann® ZZ Series freewheel sold by Zurn Industries, Inc. Marland Clutch Division in La Grange, Ill. USA, which is similar in design to bearing unit 236 in its use of two race rings or half cages and ball bearings, but further includes, mounted on either side of the balls, individually sprung sprags. The sprags and balls are arranged in the two plastic half cages which are joined together. One-way clutch 262 is arranged so as to allow free rotation drive roller 168 in a film drive direction, but upon reversal of motor 182, one-way clutch 262 locks up drive roller 168 which in turn locks up drive roller coupling 188, and shaft 186 received therein, causing a rotation of motor housing 204 and motor mount 198 which has downstream effects discussed in greater detail below, particularly with regard to FIGS. 12 and 13.

The placement of the motor mount assembly 198 and clutch arrangement 234 in the interior of the drive roller 168 provides a significant space saving feature providing for a more compact device requiring less storage space and further provides protection from splattered foam material that is particularly adept at gumming up the operation of prior art devices.

As shown in FIGS. 1 and 3, drive roller 168 is in driving engagement with a pair of driven rollers 264, 266 spaced apart on cross-cut support rod 268. FIG. 3 illustrates that the rotation axis of drive roller 168 and driven roller 264, 266 fall on a common, horizontal plane and that the spacing of the axes on that plane and the relative radius of the drive roller and driven roller is preferable arranged so as to result in driven results 264 and 266 being in a compression relationship with respect to the compressible outer layer or coating (both in the film drive state and when no film material is present between the drive roller and driven rollers). In a preferred embodiment, the diameter of drive roller 168 and driven roller 264, 266 are roughly the same (e.g., drive roller at 2.5 inches and driven rollers at 2.525 inches) and the amount of overlap to create the compression is preferably about 0.01 to 0.1 of an inch and in an even more preferred embodiment, 0.04 of an inch. That is, with a radius of 1.25 and 1.26 for the drive roller and driven roller, respectively, a central axis spacing of 2.47 results in a 0.04 of an inch degree of compression in the outer film layer.

FIGS. 20–22 provide more detailed views of driven rollers 264, 266 (since the two rollers are identical in design, reference is just made to roller 264 below). FIG. 20 shows a side elevational view of driven roller 264, and FIG. 21 shows an end view of converging end 270 of driven roller 264. As is shown in FIGS. 20–22, a continuous central bore 272 is formed in driven roller 264. Also, annular slot 274 is formed in cylindrical portion 276 for a purpose described below. At opposite ends of driven roller 264, there is provided bearing rings 278, 280 which preferably are comprised of an annular case with cylindrical roller bearings received within captures races formed in the cage. The diameter of the central bore 272 is preferably sized to receive cross-cut support rod 268 in a sliding contact relationship that is preferably a light friction contact with the cylindrical bearings (not shown) of bearing rings 278 and 280 press fit in enlarged area of bore 272 and extending slightly further radially inward to provide the desired bearing contact between driven rollers 264, 266 and support rod 268. This friction bearing contact is also sufficient for adjustment in the relative spacing of driven rollers 264, 266 along cross-cut support rod 268. In this way, the driven rollers can be easily spaced to conform to the different widths for roll film material used in making foam reception bags (e.g., a bag width range of 12–25 inches—with gusset or without gusset) is preferable, although an increase in drive roller length and all other length dependant components can provide an apparatus for any desired film width. The driven rollers also make sufficient contact with support rod 268 to avoid unintended sliding on support rod 268. Cylindrical portion 276 preferably has a knurled outer exterior, as partially represented in FIG. 20 at reference number 282, to help in maintaining film tension during the driven of the two individual film sheets compressed between the drive and driven rollers passage therethrough.

FIG. 14 shows in greater detail, cross-cut support rod 268 having a solid cylindrical main body 284 with stud reception holes 286, 288 and 290 extending through the center and opposite ends of main body 284. As shown by FIGS. 14 and 14A, the end of cross-cut support rod 268 closest to hole 290 includes protrusion 292 defined by two flat surfaces 294, 296 and two matching circumference sections 298, 300. Threaded aperture 302 extends along the central axis and into main body 284.

Protrusion 292 is designed for receipt within oval-shaped cavity 304 formed in interior projection 306 of cross-cut rod mount 232, shown in FIGS. 15–19. As shown in FIGS. 1 and 15–19, cross-cut rod mount 232 further includes external section 308 which defines annular ring section 310 which is placed flush against the exterior of wall 108 when rod 268 is in operating position. Annular ring section 310 has cut-out 312 formed therein so as to result in ring section 310 having a C-shaped configuration. As best shown in FIG. 19, cross-cut cut rod mount 232 further includes center bore 314 which shares a common central axis with threaded aperture 300 in projection 292 of cross-cut rod mount 268. A threaded fastener or the like (not shown) in inserted through bore 314 and into threaded aperture 307 to join cross-cut rod mount to cross-cut support rod 268. As an alternative embodiment, although not illustrated, there can be utilized a continuous dimension throughhole in mount 232 which receives the cylindrical end of a cylinderical support rod and is coupled to the rod with a transverse pinch screw positioned internal to wall 108 and extending through mount 232 into locking contact with support rod 268.

Interior projection 306 is shown as a cylindrical member in FIGS. 15–19. As can be seen from a review of FIGS. 1 and 7, interior projection 306 is received within circular hole 316 formed in wall 108 adjacent large hole 226. Preferably, mount 232 is formed of a plastic material with projection 306 having an external diameter sized for low friction, sliding contact with the portion of wall 108 defining circular hole 316. FIGS. 16 and 18 show thread hole 318 which, as shown in FIGS. 1 and 12, receives fastener 320 which fixes the left end of link 324 to mount 232. The opposite end of link 324 is fixed in place by fastener 322 which extends through the link 324 and into threaded reception 214 in motor amount 198 so as to interconnect motor mount 198 with cross-cut rod mount 232.

At the opposite end of cross-cut support rod 268 (FIG. 14), adjacent stud reception hole 288, there is provided a second threaded aperture 336 aligned along the central axis of rod 268. FIGS. 23 and 24 illustrate cross-cut rod bushing 328 having interior projection 330 with rod reception cavity 332 formed therein having a diameter designed to conform with that of rod 268 so as to frictionally receive the end of rod 268 adjacent stud reception hole 288. As particularly shown in FIG. 24, cross-cut rod bushing 328 further includes counter-sink hole 334 designed to receive a threaded aperture which is threaded into threaded hole 336 formed in the end of rod 288 (FIG. 14). Bushing 328 further comprises exterior flange ring 338 having interior surface 340 which is placed flush against the exterior surface of wall 106 after passing interior projection 330 through circular aperture 342 (FIG. 5) which is designed to receive in light sliding contact the interior projection 330. Thus, rod 268 is mounted on support frame structure 102 so as to rotate in unison with cross-cut mount 232 upon being rotated by the movement of link 324 as described in greater detail below.

FIG. 25 illustrates one of two cross-cut connector end studs 344 which extend through end holes 288 and 290 of cross-cut support rod 268 positioned axial outward of respective driven rollers 264, 266. FIG. 26 shows center stud 346 which is received within center hole 286 of rod 268 and locked by threaded cap 348 which preferably is tire-shaped and of a knurled plastic or elastomer material to facilitate hand disassembly of stud 346 from rod 268. Rather than the hand threaded fastener, some other quick release mechanisms such as a clip (e.g., axle clip, hair pin clip, C-shaped clip, etc.) can be utilized. Similar fingertip fastener heads or other quick release devices are preferably provided for the two fasteners 350, 352 holding drive roller bushing 220 in position on wall 108.

FIG. 26 shows center stud 346 as having first threaded end 364 threaded into corresponding threaded hole 366 in cross-cut bar 360 and second threaded end 368 which is of a length sufficient to extend through center hole 286 in support rod 268 and out a way therefrom a sufficient distance to enable the threading of hand fastener 348 (FIG. 1) thereon.

The two end studs 344 (one of two partially shown in assembled position outward and to the bottom left of driven roller 266 in FIG. 1) each have a threaded tip 354 which is threaded into respective threaded holes 356, 358 in cross-cut bar 360 the function of which is discussed in greater detail below. The opposite end 362 of end studs 344 is free of threads and is designed for light friction contact within end holes 288 and 290 in rod 268 once instead until shoulder 363 comes in contact with support rod 268 due to the threading down of hand fastener 348 on the central stud.

Thus, with this arrangement, if servicing of cross-cut bar 360 is required, an operator merely needs to remove hand fastener 348 and the cross-cut bar 360 with the three attached studs can be withdrawn from cross-cut support rod 268. As discussed in greater detail below, studs 344, 345, 346 rotate around the fixed pivot axis of cross-cut support rod 268 and therefore cause a rotation or swinging of cross-cut bar 360 about the central axis of support rod 268 as well.

As shown in FIGS. 27–29, 29A and 29B, cross-cut bar 360 features a pair of side rails 370, 372 that define therebetween heated wire clearance groove 374. FIGS. 28 and 29 further reveal the inclusion of slot 376 which opens into clearance groove 374 midway between rails 370, 372, and extends into the end of bar 360 and also out to the back side 380 of cross-cut bar 360 which is opposite the front side 382 containing rails 370, 372. FIGS. 28 and 29 show views of the left end portion of bar 360, although there exists the same arrangement at the opposite end 384 of bar 360. Threaded hole 356 is shown as extending transversely to opposite of the plane defined by slot 376. First through hole 378 extends between the front and back sides 380, 382 and second through hole 384 is further inwardly positioned with respect to first through hole 378 to provide an alternative length cross-cut wire fastener location.

FIGS. 29A and 29B show an enlarged view of the left end of bar 360 shown in FIG. 29 as well as heater wire 386 and heater wire support assembly 388. In a preferred embodiment, heater wire support assembly 388 comprises a pair of wire redirection wheels 389 (the left end one shown in FIG. 29A) received within slot 376 and having a central hole aligned with hole 356 such that tip 354 of end stud 344 is received by the lower threaded section 390 of hole 356 lying below slot 376, while the smooth, non-threaded section 392 of stud 344 (FIG. 25) extends through the central hole of wheel 389 in light frictional contact to avoid lateral shifting of wheel 389 within slot 374. With reference to FIG. 29A, heated wire 386 is fastened at one end by screw 394 with that end being coiled to provide spring section 396 in heater wire 386. Heated wire 386 passes around wheel 389 which preferably has an intermediate slit or groove 398 to provide a pulley arrangement for wire 386 being wrapped therearound. Again, the opposite end of bar 360 would preferably have a similar arrangement as that of the end illustrated in FIG. 29A. Spring section 396 in wire 386 maintains the wire in a desired state of tension and provides a degree of conformance flexibility. As shown in FIG. 29B, wire 386 is suspended off of bottom surface 400 of clearance groove 374 due to the diameter of wheel 398 being sufficient to place a portion of wheel 389 in groove 374. Preferably the diameter of wheel 389 is such that a tangent line thereoff lies flush or essentially flush on plane P, which lies flush on the front surfaces of rails 370 and 372. That is, the depth of groove 398 and diameter of wire 386 and the diameter of wheel 389 are chosen so that the frontmost portion of wire 386 lies flush on plane P or only slightly further forward or rearward of plane P.

FIG. 29B also illustrates a preferred embodiment for cross-cut bar 360 wherein a pad 550 (partially shown by way of a cut-away view) is snugly received within groove 400 so as to have an outer surface flush with plane P as well. Pad 550 is preferably formed of the same material as the outer layer of drive roller 168. Pad 550 preferably extends between the interior edge of the opposite end slots 376 (one shown in FIG. 29B). FIG. 13 provides an end view of pad 550 when wire 386 is in cross-cut formation mode while the fed film material is pinched against drive roller 168.

With reference to FIGS. 1, 10, 12 and 13, a more detailed discussion of the interrelationship between drive roller 168, cross-cut support rod 268, cross-cut bar 360, and all of the driving components therebetween is provided. FIG. 12 illustrates the interrelationship between the drive and cross-cut seal assemblies of the present invention from an end view looking in at side wall 108 with side wall 108 and some other components (e.g., bushing 225, driven wheels, etc.) removed for added clarity. FIG. 12 is also representative of the interrelationship that is present during a film drive state of operation. In the film drive state, drive roller 168, following receipt by motor 182 of a drive signal from controller 402 (FIG. 1), is placed in a stage of rotation (wherein drive roller 168 rotates in a counter clockwise direction toward the cross-cut support rod 268 as shown by free rotation "A1" in FIG. 12). This direction of rotation is made possible despite the free rotation possibility of motor housing 204 and motor mount 198, with respect to motor mount bushing 225, since any counter torque movement tendency in motor housing 204 and motor mount 198 is prevented due to the locked state of link 324, cross-cut mount 232 (and attached cross-cut support rod 268) due to the abutment of notch surface 404 with stop pin 406 affixed to side wall 108. The blocked status of cross-cut motor mount 232 (and attached support rod 268) is represented by no-rotation arrow and cross combination "B1" in FIG. 12. No rotation arrow and cross combination B2 shows a corresponding blocked rotation state in motor amount 198.

Thus, just as an operator of a hand held drill is able to preclude rotation of the drill housing during an unobstructed drilling state of a drill bit within material to be drilled, the holding of motor housing 204 in place by the locked state of stop pin 404 and cross-cut mount 232 results in less resistance in the drive roller rotation direction such that drive roller 168 rotates in the counter clockwise feed direction shown.

In this drive rotation state of drive roller 168, the locked state of cross-cut mount 232 results in studs 344 and attached cross-cut support bar 360 being in a non-engaged or stand-by state with respect to the drive roller 168, which is preferably one where studs 344, 346 and cross-cut support bar 360 are arranged along a vertical plane. Following a preset period of time of roller rotation, which is controlled by controller 402 based on an earlier operator's programming of a desired bag height to be produced by roll film bagger 100, the controller 402 sends a signal to the same motor or driver 182 to reverse rotation. Thus, the signal direction of the output shaft of motor assembly 180 is changed from the counter clockwise direction to a clockwise direction (in relationship to the preferred FIG. 12 illustrated orientation). However, rotation of drive roller 168 in a clockwise direction is prevented by one-way rotation clutch 262 shown in FIG. 10 and thus so too is locked motor shaft 186 non-rotationally held to drive roller 168 by coupling 188. Because rotation in the clockwise direction is blocked (as represented by no-rotation arrow and cross combination "B3" in FIG. 13), the path of least resistance lies in a counter clockwise movement of motor housing 204 and motor mount 198 as depicted by free rotation arrow "A2" in FIG. 13. Thus, just like an operator's arm is rotated by rotation of the entire hand drill housing upon a drill bit of that drill hitting an obstruction, so does motor mount 198 and motor housing 204 rotate when the drive shaft and drive roller 168 are obstructed by the one-way clutch.

As further shown in FIG. 13, rotation of motor mount 198 in the counter clockwise direction A2 results in link 324 shifting to the right (as shown by arrow R) which causes rotation of cross-cut mount 232 in the counter clockwise direction. In other words, cross-cut mount 232 is free to rotate in direction A3 away from stop pin 406 due to cut-out 312 formed in cross-cut mount 232 providing an unobstructed travel path for stop pin 406 with respect to cross-cut mount 232. The counter clockwise rotation in cross-cut mount 232 causes a similar rotation in cross-cut support rod 268 due to the cross-cut mount 232/key protrusion 292 engagement discussed above. While support 268 is rotating, driven rollers 264, 266 remain stationary as their bearing connection with support rod 268 offers less resistance than movement of driven rollers 264, 266 from static friction engagement with the film, which state is enhanced by the knurled surface and compression state between the drive roller 168 and driven rollers 264, 266. The peripheral angle length of cut-out 312 is preferably about 100° to ensure sufficient rotation.

As shown by a comparison of FIGS. 12 and 13, rotation of support rod 268 results in rotation of studs 344, 346 and the attached cross-cut bar 360 from the above described preferred vertical orientation to an abutment state with drive roller 168. The rotation of cross-cut mount 232 thus causes cross-cut bar 360, with its mounted heated wire 386, to rotate upwardly and inwardly toward contact with driver roller 168 for preferably an angle of about 60°.

Due to the curved circumference of drive roller 168 and the relative spacing of rails 370, 372 (e.g. a peripheral spacing of 0.5 of an inch) and also some degree of compressibility in the outer layer of drive roller 168 and pad 550, heated wire 386 makes good contact in the state shown in FIG. 13 such that a pair of film sheets, fed between drive roller 168 and driven roller 264, 266 (as explained in more detail below), is both sealed and cut to form one complete bag below and one partially complete bag above. The cut sheet is also pinched against the drive roller 168 and held there until disengagement of cross-cut bar 360 therefrom.

Following a predetermined time period of driving motor 182 in a direction wherein drive roller 168 is locked due to engagement with the one-way clutch (which is a period sufficient for the rotation of cross-cut bar 360 into engagement with drive roller for a period sufficient to form the cross-cut/seal in the juxtaposed pair of single ply, independent film sheets passing past drive roller 168), a control signal is sent out to reverse the direction of motor drive shaft rotation. As cross-cut mount 232 is designed to provide a degree of clockwise rotation freedom in the return of cross-cut mount 232 before stop pin 406 is abutted (and since the weight of cross-cut bar 360 favors that same clockwise rotation in cross-cut mount 232) the greatest torque resistance initially lies in the direction of film advancement. Accordingly, film advancement does not occur upon the initial switching of motor rotation direction away from the clutch prevention direction and toward direction A1, but instead the motor housing 204 and cross-cut mount 232 first rotates for the 60°s or so to cause link 324 to shift in a −R (to the left) and cross-cut mount to rotate in a −A3 (clockwise) direction to return cross-cut bar 360 to its original vertical state.

Once notch surface 404 comes in abutment with stop pin 406 again, however, the torque resistance in −A3 cross-cut mount rotation is greater than the required to initiate film advance. Accordingly, the switching in motor direction described above first causes a return of the cross-cut bar 360 to a disengagement state (e.g., the stand-by state) prior to rotation of the drive roller 168 in the A1 direction (for a period sufficient to feed out a predetermined bag length of film). After the predetermining length of two-ply film is fed out, the control again causes an opposite rotation of motor shaft 186 against the clutch.

Thus, under the above arrangement, a single driver source 182 acts to carry out the film advance function and cross-cut bar 360 film engagement with a minimized number of components all of which are easily disassembled. Further, the arrangement of cross-cut bar 360 with relation to drive roller 168, allows for separation of the film material above the cross-cut line and below the cross-cut line. Under prior art systems, the film fed assembly is often reversed so as to rip away the melted seal and cross-cut combination from the melting wire. Any reversal of film, in addition to increasing complexity, created in the prior art systems an increased likelihood of a mismatching is the film side edges, particularly with C-fold designs which are prone to mismatching due to the inherent difference between the unseparated C-fold edge and the separated C-fold edge. Also, the requirement for reverse rotation and then recapturing of that same distance upon restarting in a drive direction represents a significant increase in process time and thus a decrease in manufacture output.

Rather than changing the position of the film, with respect to the wire, the switching relationship between cross-cut bar 360, drive roller 168 and the pinching film therebetween, causes automatic separation without having to reverse film feed direction. With reference to FIG. 13, following the pinching of two sheets against drive roller 168 by cross-cut support bar 360 and cross-cut formation by heated wire 386 and reversal of motor direction, cross-cut support bar 360 rotates back toward the vertical direction. While rotating back in this direction, it is common for the melted plastic film to remain bonded to the heater wire. Thus, the cross-cut film both above the heated wire and below the heated wire sometimes remains connected due to the cooled heated wire and plastic adhesion therewith. Under the present invention, however, once cross-cut bar 360 passes down past vertical plane V, which also represents the normal film passage direction through the driven and drive rollers, the resistance created by the drive roller/driven roller pinching of the film above the heated wire is designed to ensure separation. That is, as cross-cut bar 360 rotates past vertical plane V and past an equivalent angle as that between the vertical and the drive roller/film contact point, the bar moves a greater distance than the length between the cross-cut seal and upstream film pinch location (defined by the driver and driven rollers). Because the non-rotation resistance in the pinching rollers (168, 264, and 266) is greater than the adhesion of the upper film segment to the heated wire, the bond is broken causing the formed bag (either filled or not filled with foam) to separate from the yet to be completely filled bag above.

The arrangement of the present invention and the ability to automatically achieve separation without reversal also means that foam insertion can be initiated immediately after the cross-cut formation (e.g., in synch with the automatic switching over from resetting the cross-cut bar to its vertical standing-by state and the initiation of film feed travel in driver roller 160 or slightly sooner in recognition of the fact that a central output of the foam will require a little bit of time before reaching the side edge of film and the possibility of a partial side edge having been pre-established to some degree). The ability to immediately start feeding foam into the next bag to be formed after sealing the top of an earlier bag and initiating the start of side film formation (as discussed below) represents a significant advantage over the above described prior art systems that first have to reverse rotation to activate separation and then move the bag back into position before foam insertion. Also, the FIG. 13 illustrated embodiment of the cross-cut device/drive roller provides an additional advantage in that it helps avoid premature operator bag separation because the angle of pinch interface mitigates the potential for an operator's pulling force to disengage the cross-cut sealing/severing bar until it rotates back into a stand-by state.

The enhanced speed of bag formation made possible under the present invention, makes it particularly suited for use with the rapid shot foam dispenser described in PCT/US98/06508, as both the dispenser and bag formation assembly operate simultaneously and at high speed so as to avoid a situation where bag formation awaits completion of the dispensing cycle or where the dispensing cycle awaits sufficient completion of the bag to receive foam material.

In addition to the improved cross-cut/seal formation described above, the present invention also provides new edge seal and vent formation assemblies that provide significant advantages over the prior art as discussed in greater detail below following an explanation of the preferred film feed arrangement of the present invention.

FIGS. 2 and 3 of the present invention illustrate a preferred roll film supply and feed arrangement of the present invention. As noted above, the prior art arrangements typically involve complicated roll feeding, tracking, monitoring and/or braking mechanisms such as a driver/active braking combination inserted into the film supply roll's inner core together with an EMF monitoring system or the like coupled therewith in an effort to control the feeding and tensioning of the film material with respect to the two drive and idle roller pairs positioned on opposite sides of the film material. Unlike such complicated prior art arrangements, the present invention presents a low number component system that in spite of the low number components provides a highly versatile system that produces high quality bags on a repeating basis with low interruption characteristics. In the present invention's system, the preferred roll film supply 410 of the present invention is simply laid in position on support rollers (122, 124). Further, the preferred roll film supply 410 is preferably a single roll of two-ply film which has independent, unconnected, opposite side edges in the two-ply stack of film sheets (rather than a C-fold film supply which includes only one unconnected side edge). A suitable source for the above described preferred roll film supply is a 0.75 mm HDPE plastic two-ply supply roll sold by WBC Extrusion Products, located in Haverhill, Mass., USA. Rolls such as the above-described are particularly suitable for use in the present invention in that they are rolled with high side edge match precision and alignment which alignment is maintained under the feed mechanism of the present invention.

FIG. 3 illustrates the feed arrangement for each of the two-ply film sheets derived from roll 410. Support rollers 122 and 124 are preferably arranged such the first ply 412 of an essentially full roll contacts roll 122 in an essentially vertical tangential relationship at the start and then more into a wrap around mode as the diameter of roll 410 reduces (e.g., a starting roll diameter of 11 inches). Second ply 414 from supply roll 410 separates from the first ply 412 at separation point S, passes between support roller 122 and supply roll 410 and then wraps about support roll 124 whereupon it is redirected downward in preferably a vertical orientation. As noted earlier, each of supply rollers 122, 124 preferably is in contact with non-active tension device 128 which helps avoid non-restrained rotation due to remaining inertia in the rollers following stoppage of the downstream drive roller.

First ply 412 extends downward (e.g., vertically downward) from roller 122 to fixed (smooth) spacer bar 138. Similarly, second ply 414 extends downward into contact with fixed (smooth) spacer bar 136. From its lowest contact point with spacer bar 138, first ply 412 extends obliquely downward and inward into contact with the knurled surfaces of driven rollers 264, 266 and into pinching location represented by the nip region formed between respective driven rollers 264, 266 and drive roller 168. Second ply 414 also extends downward and inward into contact with the drive roller and into pinching location T between the respective driven rollers 264, 266 and drive roller 168. As can be seen from FIG. 3, the present invention has a high symmetrical relationship with respect to a vertical plane passing through the center of supply roll 410 (or core 408). That is, rotatable cylinders 1221 and 124 are symmetrical about that vertical plane, and of a common size; dispenser 146 is centered on that plane; spacer bars 136, 138 are symmetrical about that plane, and of a common size; and drive roller 168 and driven rollers 264, 266 are essentially symmetrical about that plane, and are also essentially of a common diameter with respect to the vertical plane passing through core 408. In an alternate embodiment, dispenser 146 is shifted (e.g., less than an inch such as a ¼ inch shift) off from the vertical plane more toward the driven rollers and the foam reception clearance therebetween. Alternatively, an angling of the dispenser head (e.g., <10°) toward the driven wheels would also direct the foam material more toward the clearance spacing (but would also introduce more of a sideways deflection or rebound component in the flow and thus is less preferable from a potential exterior splatter standpoint).

The two nip or pinching locations between drive roller 168 and driven rollers 264, 266 represent the sole driving force locations imposed against first and second plies 412 and 414. Thus, rather than being fed or actively braked at any point from above such as in conjunction with a tracking system used in an effort to provide an accurate side edge relationship, the single motor 182, working together with the contact points at the bottom of notches 444, simply pulls the two plies down from the supply roll 410 along their respective paths.

FIG. 3, in addition to showing plies 412 and 414 in a travel state, also illustrates dispenser 146 in a dispensing mode activated in conjunction with control 402, which coordinates the film feed, film seal, vent formation and foam dispensing sequence of the present invention. The control means 402 is a conventional control means that works in conjunction with the unique structure and process steps of the present invention. For example, the control unit preferably coordinates the activities of the cross-cut heating unit, driver, vent forming means, motor, solvent/air/pressure supply of the dispenser, edge sealer(s), an operator interface and bag measuring system. The operator interface is not shown but can be any conventional operation interface such as a finger touch key pad for inputting desired parameters. The bag measuring system is preferably an encoding system represented by the combination of encoding unit 600 which rotates with the drive roller and one or more sensor triggers 602 as shown in FIG. 8.

The foam is delivered at a central location with respect to the symmetrically arranged components of the present invention that are supported by walls 106 and 108 or in a slightly offset relationship as discussed above. The foam, while in a flowable, cream state, passes through the drive system between the driven rollers where it can begin to expand at some point later. Due to the rapid filling of the bag (particularly when using the dispenser of (PCT/US98/06508), and the rapid sealing and separation of the bag provided for under the present invention, the foam mix material can be provided from the bag producer while in an early cream state (as opposed to a percentage of expanded foam being in the bag or a percentage of material immediately ready to start forming at the time of separation). For example, a time period of about 20 seconds between initial foam output into the bag and a rapid rise state is common for many types of foam. The 20 second time period represents the total time period for not only filling and forming the bag, but also for properly positioning the bag about the product to be protected (e.g., in an automated process or by an operator). Accordingly, a system that can lessen the time in filling and forming the bag provides a significant advantage from the standpoint of increased time to properly position the foam cushion and/or a lessening in the total production processing time.

The advantageous lessening of time in bag formation, filling and separation as compared to prior art system can be seen in a comparison of a cycle sequence associated with some prior art systems and the cycle sequence of the present invention. For example, a cycle sequence associated with some prior art systems involves:
 a) advance the film material (e.g., 10 in./sec);
 b) stop advance;
 c) introduce foam from dispenser (e.g., 8 lb/min)
 d) start film advance again following foam dispensing;
 e) stop film advance (e.g., at 30 inch bag location);
 f) carry out cross-cut after wire sufficiently heats up;
 g) reverse film feed to separate bag material along cut;
 h) advance film to return to pre-reverse film state.

One example of a cycle sequence for a representative embodiment of the present invention includes, on the other hand:
 a) advance film with simultaneous foam input (e.g., 10 in/sec for film feed and e.g., 16 lb/min for foam input rate);
 b) invoke essentially simultaneous step of stopping and reversing drive motor to stop film advance and shift the cross-cut bar into pinch position; and
 c) return motor to drive direction to shift cross-cut bar back into stand-by state and automatically separate bag.

Under the present invention, a 30 inch long bag can be formed and filled in about 3 seconds when the film feed is 10 in/sec and the foam is introduced into the bag while on the move and at a sufficient rate to complete a fill shot before full film length film feed out (since the 16 lb/min foam fill rate dispenses a full shot well before the 3 second full film feed out even for large volume foam shots other slower full shot dispensers can also be used without disrupting the cycle). Steps b) and c) can be carried out sufficiently fast (e.g., fractions of a second) to provide a relatively fast total cycle time.

Thus, with the present invention's foam "fill-on-the-fly", relatively high and non-disrupted film advance, coordinated foam full shot output, rapid cross-cut and automatic bag separation sequence not involving a reverse in film feed, the present invention provides a highly efficient system providing the operator with additional bag placement time for high quality products and a lessening in waste and/or a lessening in overall production time and the cost savings associated therewith.

In addition to lessening the time required for forming, filling and separating a bag, the present invention also provides for rapid bag forming repetition which would be particularly significant in an automated package supply assembly. The rapid bag forming repetition is due in part to the ability to start the next foam input cycle essentially commensurate with the cross-cut bar returning to the stand-by state which corresponds with the initiation of the film drive of the next bag to be formed. The initiation of foam dispensing can even occur within the time frame between cross-cut formation and the swinging back of the cross-cut bar as there is a brief delay between initiating the foam input cycle and having the foam actually make contact with the cross-cut seal. However, since the delay period is often helpful in providing added time for an inch or more of side edge seal formation and the corresponding lessening of the possibility of foam leakage at the sides before the side edge seals are completely, waiting for the cross-cut bar to reach the stand-by state before allowing initiation of the foam dispensing cycle is preferred.

Thus, under the present invention, there is a greater opportunity for an operator to place the filled bag in its final packing position before the bag becomes less pliable due to a significant percentage of foam initiation in the bag. Also, the foam efficiency is improved since foam expansion restriction is minimized. A common cause of expansion restriction is the dispensing of liquid foam onto expanding foam or forcing expanding foam through a confined space which could be the driven roller clearance space in less efficient prior art systems.

FIGS. 1 and 33–36 illustrate a first embodiment of edge seal card inserts 416 and 418 which are respectively received in slots 274 of driven rollers 264,266 (See FIG. 20 for slots 274). Card inserts 416 and 418 each have the same design and thus the explanation of card insert 416 in FIGS.

33–36 is applicable to card insert 418 as well. As shown in FIGS. 33–35, card insert 416 has a slender unitary body 420 which is preferably formed of a plastic material such as Delrin® or TEFLON® plastic material sold by the DUPONT company. These materials have good insulation and heat dissipation qualities as well as high strength and smooth surface characteristics making it well suited for use in card inserts 416, 418 as well as cross-cut bar 360. Wheels 389 and/or cross-cut bar 380 can also be formed of Delrin® or TEFLON® plastic material, although the combination aluminum with the aforementioned pad works well for the present invention with an additional possibility being a (e.g., cylindrical) cross-cut bar 380 formed of polypropylene or the like with an attached wire and preferably a glass tape insulator therebetween.

The thickness of edge seal insert 416 corresponds with the width of slot 274 in the driven roller 264 such that inserts are received in a sliding, light friction relationship upon insertion. In addition, each insert has a hook-shape defined by curved front section 422, hook cavity 423 and back section 424. Front section has curved front edge 426 which has a radius (e.g., 1.25 inches) sufficient to provide a minimal central film wire support area 428, which can also be formed by a short, flat front edge wall of insert 416. Hook cavity 423 is partially defined by spring lever 430 which is supported at its base 432 by bottom portion 434 and spaced from front section 422 by slot 436.

Spring lever 430 has concavity 438 on its interior side which is opposed to curved section 440 of back wall 442 further partially defining cavity 423. The spacing between concavity 438 and curved back wall 442 is set up such that lever 430 deflects outward in spring bias fashion when edge seal card 416 is inserted such that cavity 423 receives interior extension 275 of driven roller 264 (with cavity 423 orientated first in a somewhat horizontal fashion during insertion and then in a vertical orientation when fully installed). In back section 424 of edge seal card 416 there is formed notch 442 with interior curved surface 446 that has a radius that conforms to the radius of edge seal rod 448 shown in FIGS. 1 and 32. Edge seal rod extends between walls 106 and 108 and is held in position by edge seal rod bolts (with a suitable bolt embodiment shown in FIGS. 30 and 31) which thread into the open ends of edge seal rod 448. Edge seal rod 448 is spaced forward of cross-cut support rod 268 a distance equal to the space between interior curved surface 446 and curved section 440 of edge seal card insert 416. Thus, at the time of insertion of edge seal card insert 416, insert 416 is first substantially vertically orientated such that notch 444 receives edge seal rod 448 and then rotated toward annular slot 274 until interior extension 275 slides into cavity 423 while deflecting spring lever 430 toward slot 436 until eventually settling into facing concavities 438 and 440. As discussed above, even when insert 416 is fully settled on interior extension 275, spring lever 430 is deflected outward and central film wire support area 428 is spaced a distance (e.g., 50/1000's of an inch) out from the preferably knurled surface of driven roller 264 (when drive roller 168 is not in place). The spring action in spring lever 430 creates a corresponding bias in central film wire support area 428 and, therefore, when drive roller 168 is in place, central area 428 is pushed back against the forward bias of lever 430 to create a forward force (e.g., 4 lbs.) in heated wire 450 (see FIG. 36) which is pressed against the two layers of film passing between the driven and drive rollers. Accordingly, the heated wire 450 is maintained in a continuous, biased contact with the film layers to enhance edge film seal quality between the film layers and also the drag effect of the film passing past the heating unit helps provide a self-cleaning effect. By applying the proper electric current along wire 450 extending across central film wire support area (e.g., 3 volts), a high quality side seal is formed. This amount of energy is relatively low due to the efficient arrangement of the seal insert (e.g., a minimization in the amount of exposed resistance heating wire such as less than 1 cm in length exposed heating wire). One method of providing venting in the cushion bag to be formed is through use of the prior art technique of briefly discontinuing the energy supply while edge seal inserts 414 and 416 are close to the upper cross-cut location. Under this technique, venting holes on both sides of the bag are formed in interrupted edge side seals extending up from the last formed cross-cut. However, as described below, the present invention features a more preferred technique wherein a vent or vents are formed by separate vent forming means and the edge sealer is not disrupted so that an uninterrupted side edge seal is formed. FIG. 36 shows edge heater wire 450 which is secured at opposite ends to cylindrical conducting posts (not shown) fixedly received within first and second holes 458 and 459. Wires 450' and 450" enter/exit passageway 452 originating at back section 424 of insert 416 and which passes to internal hole 454 via slanted shunt 456. Wire 450' is secured to the conducting post fixed in hole 458 while exiting wire 450" is connected to the conducting post in hole 459. Resistance heater wire 450 extends preferably above protective insulation tape 460.

With reference to FIGS. 1 and 32, edge seal rod 448 is shown as a substantially hollow tube having a plurality of extended slots or openings along one side of the edge seal rod. These slots provide exit and reentry locations for wiring passing to the heated wires in each of the above described edge seal card inserts 416 and 418 and heated wire 386. Thus, edge seal rod functions both as a back support for the edge seal inserts 414, 416 and also as a wire feed and protection device. The entering and exit wires in edge seal rod 448 pass through a central opening in one or both of threaded insert 459 to the appropriate energy source (not shown) and/or control unit 402. Hollow edge seal rod therefore provides a protective passageway for wiring that avoids any inadvertent catching of wiring during operation.

Figure 40:
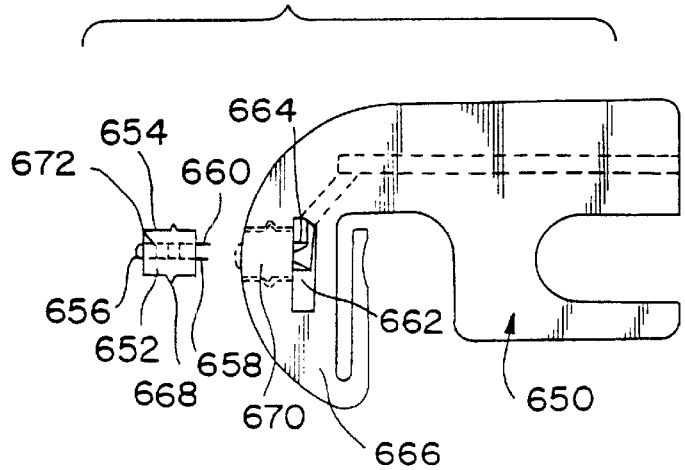
FIG. 40 shows an edge sealer of the present invention with detachable plug-in heating unit.

FIG. 40 shows an alternate embodiment of an edge sealer 650 which is similar to edge seal cards insert 416 except for the advantageous presence of plug-in heat unit 652 having plug-in housing 654 supporting exposed heat element 656 and fairly rigid plug prongs 658, 660 (similar to an automotive fuse arrangement). Plug prongs 658, 660 are plugged into corresponding plug receptors 662 and 664 to provide a continuous heating element circuit. Plug receptors 662, 664 are formed either integrally within main body 666 of edge sealer 660 or a receptor unit can be slid into place with its attached wires. Fastened plug-in heat unit 652 can be held simply by light friction (reception cavity in main body 660 and plug receptors 662, 664) or additional holding means such as deformable projections 668 can be utilized. FIG. 40 shows the final resting position by dashed lines which is similar to insert 416's heat element location (except for the exposed flat surface of plug-in). As it is the heat element that is prone to wear out first, this arrangement greatly simplifies replacement of the heating element in a minimal amount of time to avoid production delays. Also, no tools are needed as reception chamber 670 in main body 666 can have an at least partially exposed side wall section which allows finger contact with a friction enhanced grooves 672 along a common side of plugs-in unit 652 to facilitate slide out removal similar to battery cover removal in some battery operated devices.

Figure 39:
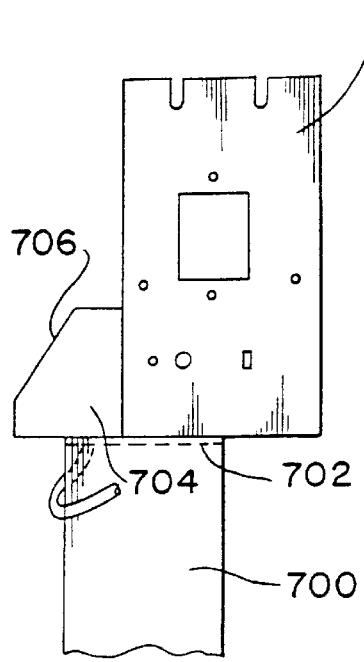
FIG. 39 shows a side elevational view of a support stand structure of the roll film bagger apparatus of the present invention.

FIG. 39 shows an alternate embodiment of the present invention wherein frame structure 550 (FIG. 37) is mounted on a vertical, stand alone support stand (partially cut-away as the base can take on any desired form) which has a C- or U-shaped cross-section and is preferably similar to the support stand described in PCT/US98/06508 wherein the solvent container is provided internally at the base of the support stand. Support stand 700 preferably has at least a partial upper top cover section 702 to which is attached frame structure 500 such as along flange 524 (FIG. 37). Rearward of support structure 500 is casing 704 in which is preferably supported electrical components including control unit (402 in FIG. 1) and a touch pad operator interface supported on outer face 706 of casing 704. Also, the various supply lines such as the foam precursor lines, solvent and air lines are preferably funneled through casing 704 to the desired connection arrangement with dispenser 146 (FIG. 38). Also, as in PCT/US98/06508, suitable on/off solenoid valves can be placed in line with the solvent and air lines to flush dispenser 146 and turn off and on the foam flow through dispenser 146 at the desired points in time. The operator interface can also be made remote (e.g., transmitter/receiver arrangement or elongated wire) or placed at another location if the illustrated location is not convenient.

Figure 41:
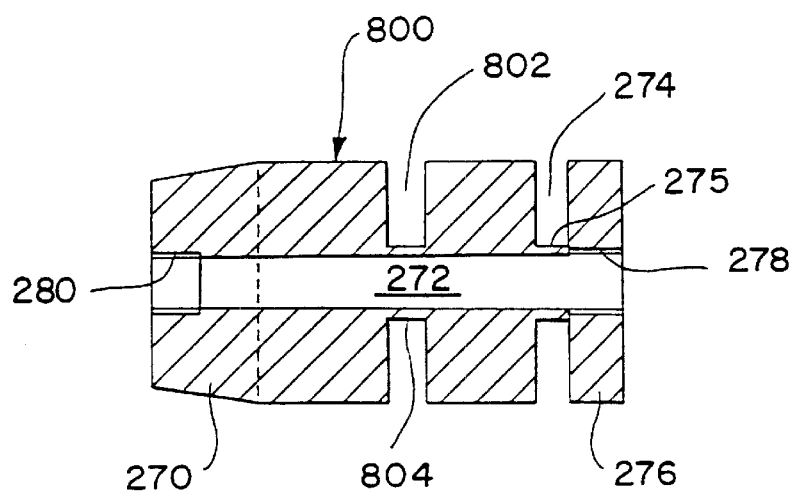
FIG. 41 shows a modified embodiment of the driven roller shown in FIG. 22.

FIGS. 41–45 illustrate one preferred embodiment of the present invention featuring edge sealer means and separate and distinct vent forming means. FIG. 41 shows a modified embodiment of driven roller 264 shown in FIG. 22. As the driven roller 800 shown in FIG. 41 shares many similarities with the FIG. 22 embodiment, only the differences are emphasized below and some come reference numbers are retained for like components. Rather than having a single slot 274 and single interior extension 275, driven roller 800 shown in FIG. 41 includes a second slot 802 and second interior extension 804 combination for receiving and supporting a second card insert. As explained in greater detail below, second slot 802 is positioned internally of first slot 274 for receiving a vent hole former which is preferable supported by a similarly configured insert card main body as that of the edge sealer 416 (or 650) described above. The opposite side driven roller has the same configuration as that of driven roller 800 and is positioned on the driven roller support bar in a mirror image relationship with roller 800.

The spacing between first and second slots 274 and 802 is preferably 1 to 3 inches (e.g., 2.5 inches) inward of slot 274 so as to provide a similar spacing between the vent hole and edge seal. This spacing is helpful in avoiding the prior art problem of vent blockage due to side edge curling. However, as discussed below, while the above noted spacing is preferred the most foam cushion bag embodiments, the spacing between the slots can be varied to suit the particular application including an actual no-spacing or overlap arrangement out to beyond 3 inches (e.g., 6 inches).

Figure 42:
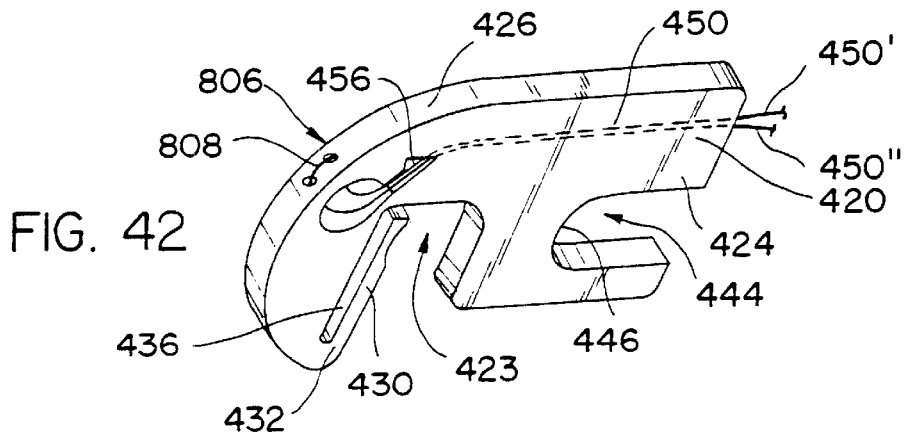
FIG. 42 shows a perspective view of a vent former of the present invention.
Figure 45:
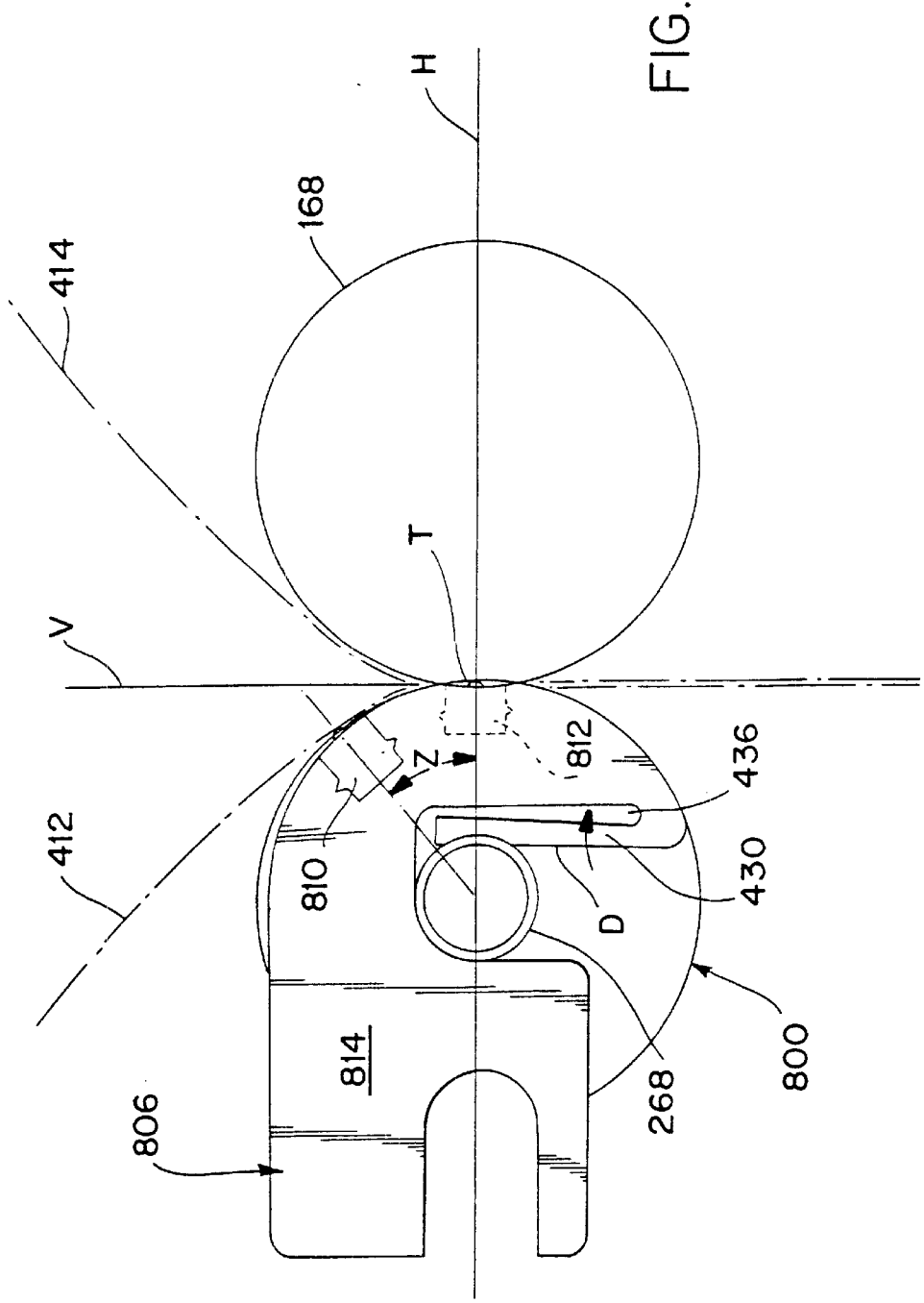
FIG. 45 shows a schematic representation of the vent former and edge sealing heating units with respect to the film.

FIG. 42 shows one embodiment (806) of a vent hole former suitable for insertion within second slot 802. Vent hole former 806 has a similar configuration and many of the same components as that of the earlier described edge seal insert 416 of FIG. 36 and thus only the differences are emphasized and some common reference numbers are involved. Reference is also made to FIG. 45 which helps illustrate a major distinction between edge sealer insert 416 and vent former 806. As shown in FIG. 42, vent hole former 806 has exposed heater wire section 808 which is similar to exposed wire section 450 of edge sealer 416 except for its relative positioning on the curved front edge 426 of the main body 420 of the insert. FIG. 45 illustrates the difference in positioning between a heating element for a vent former (810) and a heater element for an edge sealer (812) with respect to the film feed and film drive assembly. FIG. 45 also illustrates that vent former 806 can alternatively feature a plug-in heat unit similar to that shown in FIG. 40 for an edge sealer rather than the non-plug embodiment shown in FIG. 42.

FIG. 45 shows edge sealer heat element 812 in dashed lines as it would preferably be positioned on a separate card insert than insert 814 supporting vent former heating element 810, although a common support arrangement is also featured under the present invention as described below. As shown in FIG. 45, the heat element 812 for the edge sealer is positioned at nip or pinch location T so that heating element 812 can properly form a seal that is preferably an uninterrupted seal over the entire side edge of a cushion being formed since no venting function is required at this edge seal under the preferred arrangement of the present invention. Driven roller 800 would be equivalently positioned as driven roller 266 shown in FIG. 1, and thus heating element 812 is spaced outward (i.e., below the plane of the drawing sheet) with respect to heating element 810 in the arrangement illustrated in FIG. 45.

Heating element 810 of vent hole former 806 is positioned on main body 816 is positioned on main body 816 (or 424 in the FIG. 42 embodiment) further upstream with respect to film travel by angle Z. That is, heat element 810 is positioned vertically above horizontal plane H extending through the central axis of both drive roller 168 and support rod 268 as well as nip location T, and horizontally forward of vertical plane V passing through nip location T on the side opposite the side the drive roller 168 is located. Angle Z is arranged so that heat element operates to heat cut film ply 412 prior to film ply 412 reaching nip location T and is also positioned far enough away from film ply 414 so as not to adversely effect the film ply 414. Thus, a vent hole is formed in only one of the two film sheets being sealed together downstream to form a bag. An angle Z of 70 degrees is preferred.

FIG. 45 also illustrates the above described biasing produced by the deflection of spring lever 430 of an insert. As shown in FIG. 45, spring lever 430 is deflected so as to partially close up the adjacent slot with the deflection direction depicted by arrow D in FIG. 45.

While a heat cutter has been described above as the preferred vent former of the present invention, alternate vent forming means may also be relied upon such as cutting blades with or without a protective sheathing, etc.

Figure 43:
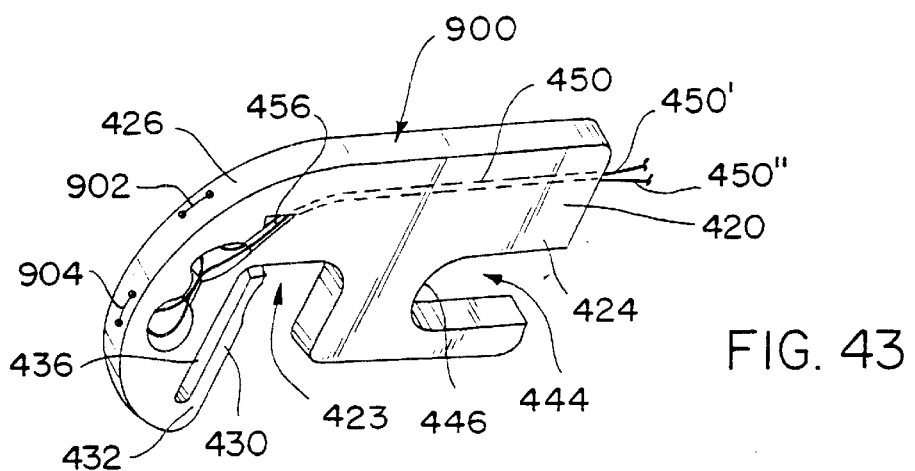
FIG. 43 shows a perspective view of an edge sealer and vent former on a common main body.
Figure 44:
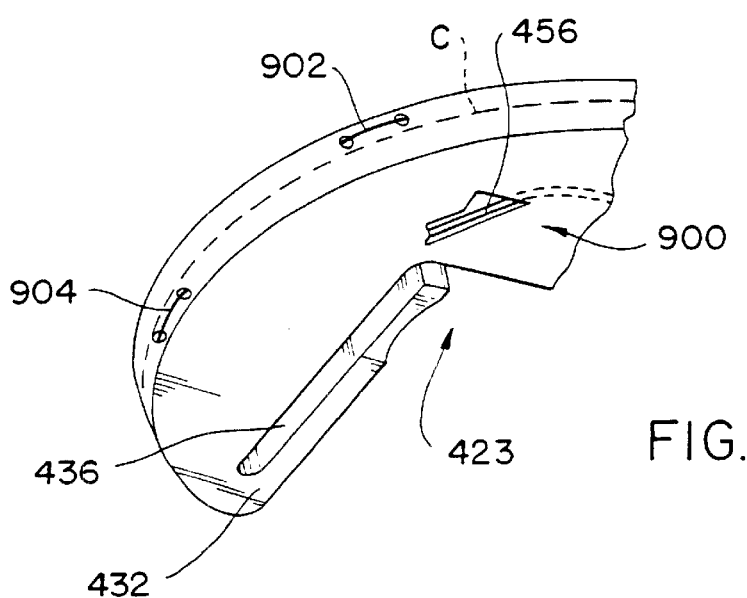
FIG. 44 shows an enlarged view of that which is shown in FIG. 43.

FIGS. 43 and 44 show an alternate embodiment of the present invention wherein a single card insert 900 supports both the vent former and edge sealing units (902,904, respectively). With the embodiment shown in FIGS. 43 and 44, a driven roller with only a single slot such as that shown in FIG. 22 can be utilized in view of the single insert support. As further illustrated by FIGS. 43 and 44 (FIG. 44 being an expanded view of a portion of FIG. 43), vent hole former 902 is slightly offset (e.g., 1/16 to 1/4 inch) from edge sealer 904, such that the edge seal formed by edge sealer 904 is spaced outward of the more interior vent hole formed by vent former 902. As a preferred embodiment features two inserts on the two opposite sides of the film material and since the vent hole former is spaced internally of the edge sealer on both sides, there will be two separate inserts having essentially the same arrangement except one will be a left side insert and the other one a right side insert. Color coding or indicia can be provided to clarify which is which.

The expanded view of FIG. 44 provides a better view of the relative lateral spacing for vent former 902 and edge sealer 904, which are both heat elements (e.g., plug-in or non plug-in) in a preferred embodiment. The angle spacing is the same as that described for FIG. 45. FIG. 44 also shows center curve C, positioned between the laterally spaced members 902 and 904. Since the vent hole formation typically produces a hole having a lateral width greater than the lateral width of the edge seal, another embodiment of the present invention features having edge sealer unit 904 and vent former 902 aligned along curve C (i.e., not laterally spaced) as the edge sealer can be continuously run over the entire length of the bag but when it reaches the upstream formed vent hole it is unable to completely seal off that area due to the lateral width of the vent hole being greater than the seal width, and thus a vent is formed due to the incomplete sealing in this area. This provides the advantage of not having to differentiate a right side insert and a left side insert since both inserts will have the same configurations in this embodiment.

Figure 46:
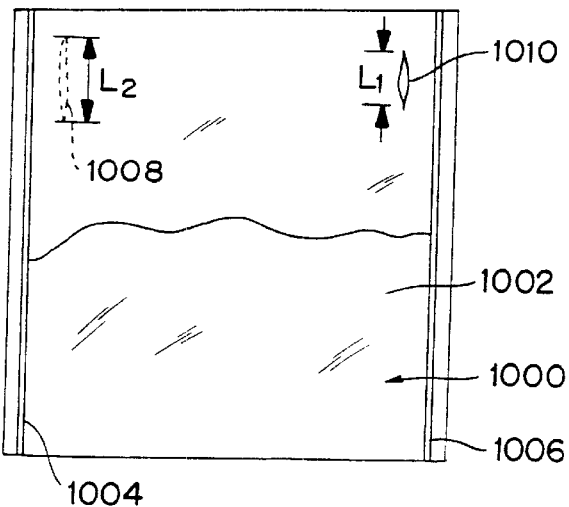
FIG. 46 shows a front elevational view of a completed bag cushion.

FIG. 46 shows a foam cushion 1000 formed with the edge seal and vent hole former arrangement shown in FIGS. 41 and 42 having foam 1002 in an initial rise state as well as opposite, continuous edge seals 1004 and 1006 on opposite sides of cushion 1000. FIG. 46 also shows vent holes 1008 and 1010 formed inward of respective side edge seals (e.g., 1–3 inches or even closer 1/16–1/4 inch in using the FIG. 43 embodiment or 0 inches if using an overlap arrangement as described for FIG. 44). One advantage of forming the vent holes separate from the seal edge is that length adjustment to better suit a particular foam vent requirement is achievable independently of forming the edge seal and thus lengthened or a series of vent holes can be formed without disrupting the edge seal. FIG. 46 illustrates two separate lengths L1 and L2 for the same cushion showing some of the versatility of the present invention. Also, vent hole 1008 is shown in dashed lines to show that the option exists under the present invention to not only vary the length or number of vent holes on each side without disrupting the seal, but one or the other side of the foam cushion can be made vent-less to suit a particular package configuration or particular type of film material supply (e.g., switch to a C-fold supply wherein only one edge seal is required). The vent-less mode is achieved merely by a hand removal of an undesired insert from one of the driven rollers.

Figure 47:
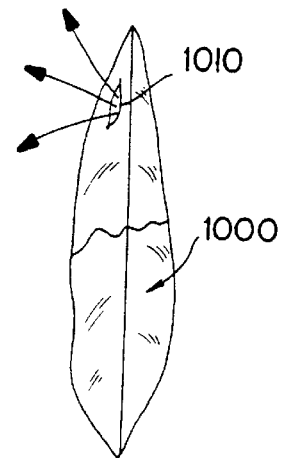
FIG. 47 shows a side elevational view of the cushion bag shown in FIG. 45.
Figure 49:
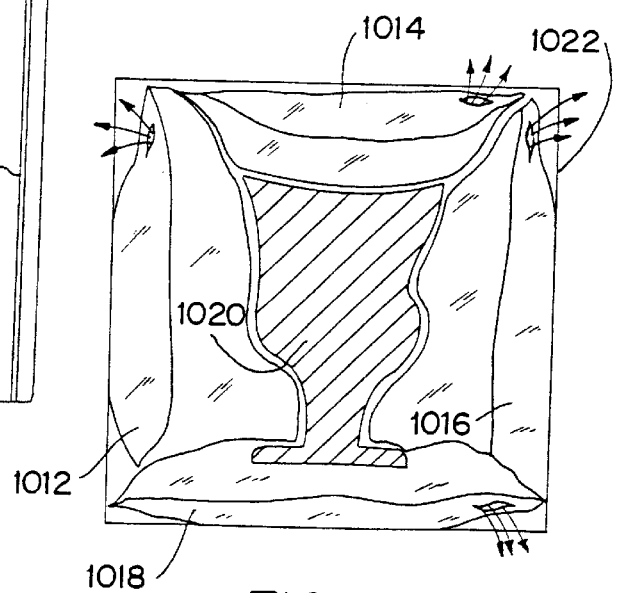
FIG. 49 shows a positioning of a plurality of foam cushions within a package and about a product to be protected.

FIG. 47 shows a side elevational view of that which is shown in FIG. 46 and clearly illustrates another unique feature of the present invention in that under the distinct edge sealer and vent hole forming means arrangement of the present invention, the vent hole is only formed on one face of the foam cushion rather than on both faces as in the prior art. This provides a significant advantage from the standpoint that there can be avoided product contamination by foam material spilling out of a vent by positioning the face with the vent hole away from the product. FIG. 49 illustrates this advantage in that each of cushion bags 1012, 1014, 1016 and 1018 can be arranged so that any foam spillage is directed at the interior of package 1022 and away from product 1020. Another advantage of the present invention is that any time the edge seal spacing is adjusted to suit a particular bag type or width, a corresponding shift in the vent hole former is achieved due to the common support of the adjustable driven roller.

Figure 48:
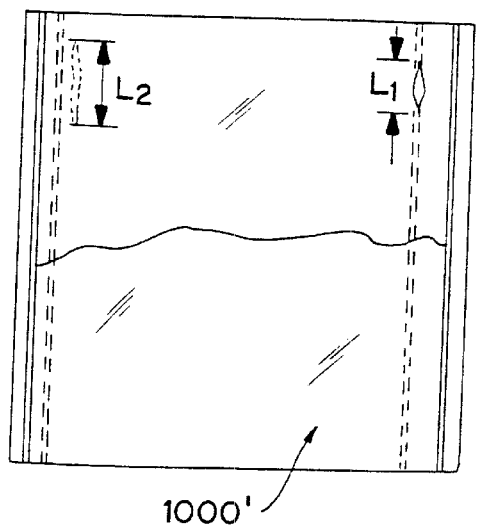
FIG. 48 shows an alternate embodiment of the bag cushion shown in FIG. 46.

FIG. 48 further shows some of the additional versatility afforded by the present invention in that the two slot arrangement in the driven roller can be used to form a parallel second safety edge seal to lessen the chance of seal edge blow out and contamination damage to a product. The second edge seal is shown in FIG. 48 on cushion 1001 by dashed lines in view of its optional nature. FIG. 48 also illustrates the vent hole/edge seal overlap arrangement previously described in relation to FIG. 44. As still an additional example of the versatility of the present invention, FIG. 48 also shows on the left side of cushion 1000' an arrangement wherein a parallel second seal edge is formed as well as an inwardly positioned vent hole formed by an insert such as shown in FIG. 43 or even a separate insert provided in another reception slot formed in the driven roller.

Figure 50:
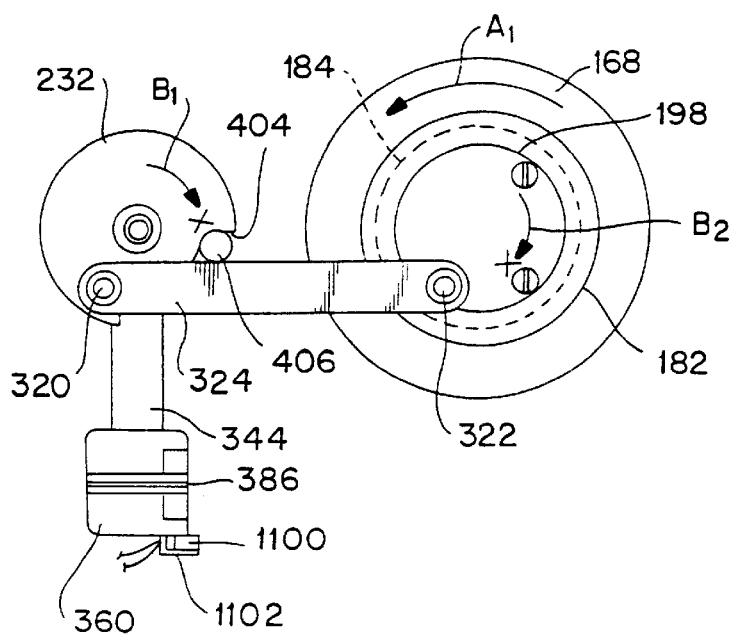
FIG. 50 shows an alternate embodiment of vent forming means for the present invention in a stand-by state.
Figure 51:
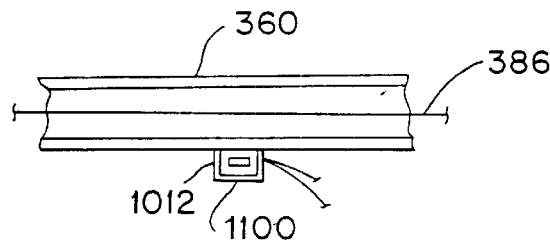
FIG. 51 shows a cut-away, front view of the vent forming means of FIG. 50.
Figure 52:
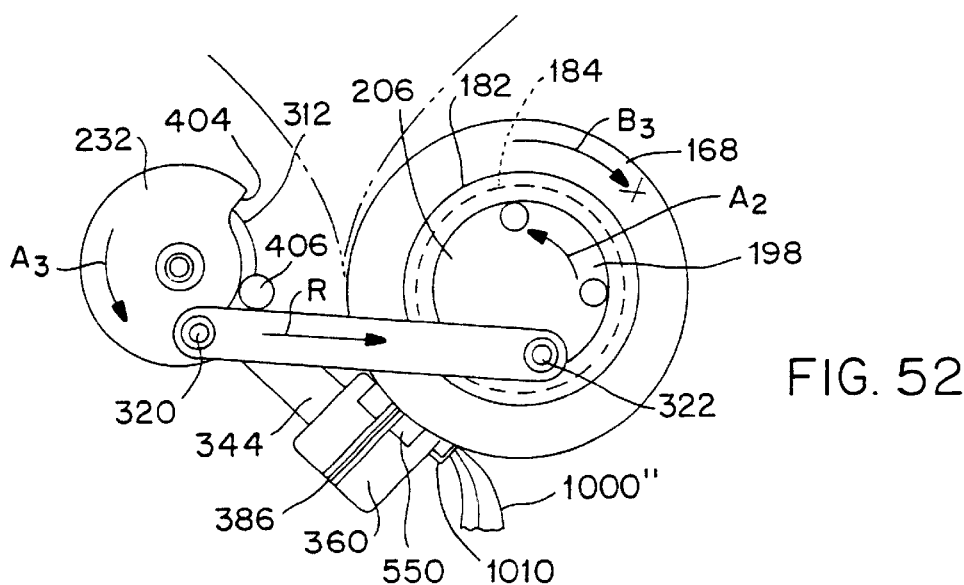
FIG. 52 shows the vent forming means in vent forming mode.

FIGS. 51–53 illustrate still another embodiment of the present invention which features vent hole former 1100 positioned preferably in an intermediate area of cross-cut bar 360 and is supported by support housing 1102 underneath bar 360. Vent hole former 1100 is shown as a plug-in heat element like that earlier described for FIG. 40 although a puncture or slicing device are alternative choices. As shown by a comparison of FIGS. 50 and 52 venting is provided simultaneous with cross-cut formation as the cross-cut bar assumes the pinching relationship with the roller. When using a heated element for vent former 1100 both plies can be formed with a vent hole during the pinching operation or, alternatively, with an appropriate spacing (e.g., vertical spacing) of heated element from the location of cross-cut wire 386, the vent hole formation can be concentrated on one of the formed bag's faces. With similar appropriate spacing and/or angling of the vent hole former, a blade cutting element or puncture device can be utilized either directed at both plies or directed at only one face of "cushion 1000".

The bag forming apparatus of the present invention is particularly well suited for use with a high speed, high volume foam dispenser for producing foam-in bag products for packaging as the automatic cross-cut avoids bag separation delays associated with reverse film feed/separation requirement of the prior art and the forward feeding of the film material and foam input cycle can be started immediately upon formation of the upper bag's bottom seal (or at least upon return of the cross-cut bar to a stand-by state) and the bag feed can be continued prior to, during and after foam input, the fast cushion bag formation speed (e.g., <5 seconds) provides the operator with greater time to place a removed bag in position and provides a high quality foam bag.

Although the present invention has been described with reference to preferred embodiments, the invention is not limited to the details thereof. Various substitutions and modifications will occur to those of ordinary skill in the art following a review of this application, and all such substitutions and modifications are intended to fall within the spirit and scope of the invention as defined in the appended claims.

What is claimed is:

1. A bag film edge sealer, comprising:
a main body having a capture recess formed therein which is dimensioned for frictional attachment and removal to a support component of a bag film support assembly positioned adjacent film material being fed therepast during operation, and said edge sealer having a sealing element which is positioned on said main body relative to said capture recess so as to form an edge seal which is elongated in a direction travel of film past the bag film edge sealer.

2. A bag film edge sealer as recited in claim 1 wherein said capture recess is at least partially defined by a biasing device.

3. The edge sealer as recited in claim 1 wherein the capture recess of said edge sealer is defined by a flexible lever.

4. The edge sealer as recited in claim 3 wherein said level includes an intermediate recess region which receives therein the support component of the bag film support assembly such that the main body and sealing element extend out away from the bag film support assembly for independent, biased contact with the film material.

5. The edge sealer as recited in claim 1 wherein said main body has a card like configuration for insertion within a thin recess defined by the support component.

6. The edge sealer as recited in claim 1 wherein said main body is a monolithic body formed of a plastic material.

7. A bag film edge sealer, comprising:
a main body having a capture recess formed therein which is dimensioned for frictional attachment and removal to a support component of a bag film support assembly positioned adjacent film material being fed therepast during operation, said edge sealer further comprising a heating unit supported by said main body along a curved support portion of a side edge of said main body.

8. The edge sealer as recited in claim 7 wherein the capture recess of said edge sealer is defined by a flexible lever.

9. The edge sealer as recited in claim 7 wherein said main body has a card like configuration for insertion within a thin recess defined by the support component.

10. The edge sealer as recited in claim 7 wherein said main body is a monolithic body formed of a plastic material.

11. A bag film edge sealer, comprising:
a main body having a capture recess formed therein which is dimensioned for frictional attachment and removal to a support component of a bag film support assembly positioned adjacent film material being fed therepast during operation; and
a heating unit supported by said main body, and
wherein said main body has a thin, card-like configuration and said heating unit is positioned along a relatively short extension of an exposed peripheral side edge of said main body.

12. A bag film edge sealer as recited in claim 11 wherein said heating unit includes an extension of a heating wire which extends from a first location in said exposed peripheral edge to a second location in said exposed peripheral edge that is spaced less than an inch from said first location.

13. The edge sealer as recited in claim 11 wherein the capture recess of said edge sealer is defined by a flexible lever.

14. A bag film edge sealer, comprising:
a main body having a capture recess formed therein which is dimensioned for frictional attachment and removal to a support component of a bag film support assembly positioned adjacent film material being fed therepast during operation,
wherein said capture recess is at least partially defined by a biasing device, and
wherein said biasing device is a lever extension of said main body having an interior edge positioned for contact with the support component and an exterior edge separated from a remaining portion of said main body.

15. A bag film edge sealer, comprising:
a main body having a capture recess formed therein which is dimensioned for frictional attachment and removal to a support component of a bag film support assembly positioned adjacent film material being fed therepast during operation,
wherein said main body has a film facing surface with a cartridge reception opening formed therein, and said film edge sealer further comprising
a cartridge which includes a plug-in base designed for plug-in reception by the reception opening of said main body and a heating unit supported by said base.

16. A plastic film sheet edge sealer, comprising:
a main body having a first contact end for contacting material to be sealed and a second end, said main body further comprising a capture recess formed therein for frictional attachment and removal to a support component of a device feeding the material to be sealed to said edge sealer, and the first end of said main body including a peripheral section and a first sealing element which is positioned along said peripheral section, and the peripheral section of said main body being formed of a material with a greater heat insulation value than material of said edge sealer positioned along said peripheral section.

17. The edge sealer as recited in claim 16 wherein said capture recess is defined by a lever which is bendable during frictional attachment of said main body to the support component.

18. The edge sealer as recited in claim 17 wherein a side of said lever has a concave recess for conforming to a surface of the support component.

19. The edge sealer as recited in claim 16 wherein said main body includes a slot independent of said capture recess.

20. The edge sealer as recited in claim 19 wherein said slot has a direction of elongation which is different than a direction of elongation of said capture recess.

21. The edge sealer as recited in claim 20 wherein the direction of elongation of said capture recess is vertical when said edge sealer is in operating position and the direction of elongation of said slot is horizontal in the operating position.

22. The edge sealer as recited in claim 16 wherein said main body is a monolithic body which has a card like configuration for insertion within a thin recess defined by the support component.

23. The edge sealer as recited in claim 22 wherein said sealing element is a first heating element, and said monolithic body is formed of a material with greater heat insulation than that of said first heating element.

24. The edge sealer as recited in claim 16 wherein said first heating element is an exposed wire extending for less than an inch on said peripheral surface, when peripheral surface is curved.

25. The edge sealer as recited in claim 24 wherein said main body includes first heating element wire feed passageways formed therein and opening out at the peripheral surface.

26. The edge sealer as recited in claim 24 further comprising a second heating element also positioned along said peripheral surface.

27. The edge sealer as recited in claim 26 wherein said first and second heating elements are in a non-alignment relationship with respect to a curved line extending centrally along the peripheral surface which is a curved peripheral surface.

28. The edge sealer as recited in claim 16 wherein said first heating element is a heating element cartridge which is received in a cartridge reception cavity in said main body so as to present a heat unit of said cartridge heating element along a curved portion of said peripheral surface.

\* \* \* \* \*